(12) United States Patent
Fukubayashi et al.

(10) Patent No.: US 10,074,987 B2
(45) Date of Patent: Sep. 11, 2018

(54) STORAGE BATTERY MANAGEMENT DEVICE, STORAGE BATTERY, METHOD OF MANAGING STORAGE BATTERY, AND STORAGE MEDIUM

(71) Applicant: NEC Corporation, Tokyo (JP)

(72) Inventors: Yuichiro Fukubayashi, Tokyo (JP); Yasuaki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 150 days.

(21) Appl. No.: 15/021,414

(22) PCT Filed: Jul. 7, 2014

(86) PCT No.: PCT/JP2014/068076
§ 371 (c)(1),
(2) Date: Mar. 11, 2016

(87) PCT Pub. No.: WO2015/045552
PCT Pub. Date: Apr. 2, 2015

(65) Prior Publication Data
US 2016/0226250 A1 Aug. 4, 2016

(30) Foreign Application Priority Data
Sep. 27, 2013 (JP) .................. 2013-200774

(51) Int. Cl.
*H02J 7/00* (2006.01)
*H02J 3/32* (2006.01)
(Continued)

(52) U.S. Cl.
CPC ............. *H02J 3/32* (2013.01); *G06Q 50/06* (2013.01); *H02J 3/008* (2013.01); *H02J 7/0063* (2013.01);
(Continued)

(58) Field of Classification Search
CPC .. G06Q 50/06; H02J 2007/0067; H02J 3/008; H02J 3/32; H02J 7/0063; Y04S 10/54; Y04S 50/10
See application file for complete search history.

(56) References Cited

U.S. PATENT DOCUMENTS

| 2010/0017045 A1 | 1/2010 | Nesler et al. |
| 2010/0076825 A1 | 3/2010 | Sato et al. |

(Continued)

FOREIGN PATENT DOCUMENTS

| CN | 102498630 A | 6/2012 |
| CN | 102891496 A | 1/2013 |

(Continued)

OTHER PUBLICATIONS

Singaporean Office Action issued by the Intellectual Property Office of Singapore in counterpart Singaporean Patent Application No. 11201601833W, dated May 8, 2017.

(Continued)

*Primary Examiner* — Vuthe Siek
(74) *Attorney, Agent, or Firm* — Finnegan, Henderson, Farabow, Garrett & Dunner, L.L.P.

(57) ABSTRACT

Provided is a storage battery management device (10) including a price information acquisition unit (11) that acquires power purchasing price information indicating a power purchasing price for each time period of power supplied from an electric power system, a remaining discharge capacity information acquisition unit (12) that acquires remaining discharge capacity information indicating the amount of power that can be discharged to a load from a storage battery, and a discharging schedule generation unit (13) that generates a discharging schedule in which an upper limit of the amount of power discharged from the storage battery is determined for each of a plurality of discharging time periods divided for each unit time, using (Continued)

the power purchasing price information and the remaining discharge capacity information.

16 Claims, 21 Drawing Sheets

(51) Int. Cl.
*H02J 3/00* (2006.01)
*G06Q 50/06* (2012.01)

(52) U.S. Cl.
CPC ........ *H02J 2007/0067* (2013.01); *Y04S 10/54* (2013.01); *Y04S 50/10* (2013.01)

(56) References Cited

U.S. PATENT DOCUMENTS

| | | | |
|---|---|---|---|
| 2011/0199052 A1 | 8/2011 | Sun et al. | |
| 2012/0005126 A1 | 1/2012 | Oh et al. | |
| 2012/0296482 A1* | 11/2012 | Steven | G06Q 50/06 700/291 |
| 2013/0069596 A1* | 3/2013 | Ochiai | B60L 3/0046 320/118 |
| 2013/0181518 A1 | 7/2013 | Suyama et al. | |

FOREIGN PATENT DOCUMENTS

| | | |
|---|---|---|
| JP | 2002-369380 | 12/2002 |
| JP | 2006-325336 | 11/2006 |
| JP | 2010-81722 | 4/2010 |
| JP | 2011-50240 | 3/2011 |
| JP | 2011-130618 | 6/2011 |
| JP | 2011-130618 A | 6/2011 |
| JP | 2012-115003 | 6/2012 |
| JP | 2013-176189 | 9/2013 |
| WO | WO 2012/145563 A1 | 10/2012 |
| WO | WO2012-145583 A1 | 10/2012 |

OTHER PUBLICATIONS

Extended European Search Report issued by the European Patent Office in counterpart European Patent Application No. 14845555.4, dated Apr. 6, 2017.
Alcatel-Lucent et al., "Introduction of Enhanced RNTP and UE-CSI Reporting", 3GPP TSG RAN WG3 Meeting #85, R3-141834, Aug. 17, 2014.
Alcatel-Lucent et al., "Introduction of Signaling for US-CSI Information", 3GPP TSG RAN WG3 Meeting #85, R3-141835, Aug. 17, 2014.
Nokia Works, "Test Proposal for Subband Definition", 3GPP TSG RAN WG3 Meeting #88. R3-151211, May 29, 2015 (Applicant notes that this document is incorrectly labeled R3-151208).
Alcatel-Lucent, "Signalling Details and Procedures Supporting eCoMP", 3GPP TSG RAN WG1 Meeting #76bis, R1-141725, Mar. 31-Apr. 4, 2017.
Extended European Search Report dated Oct. 4, 2017, issued in related European Patent Application No. 15183576.8.
Notification of First Office Action dated Aug. 2, 2017 from the Chinese Patent Office in counterpart Chinese Patent Application No. 201480051900.7.

\* cited by examiner

FIG. 6

| TIME PERIOD | POWER PURCHASING PRICE (YEN / kwh) |
|---|---|
| 0~7 O'CLOCK | XX |
| 7~11 O'CLOCK | XY |
| 11~13 O'CLOCK | YY |
| 13~17 O'CLOCK | ZZ |
| 17~21 O'CLOCK | ZY |
| 21~24 O'CLOCK | ZX |

FIG. 12

| GROUP | POWER PURCHASING PRICE (YEN / kwh) |
|---|---|
| FIRST GROUP | EQUAL TO OR HIGHER THAN ○○ |
| SECOND GROUP | LOWER THAN ○○ |

STORAGE BATTERY MANAGEMENT DEVICE, STORAGE BATTERY, METHOD OF MANAGING STORAGE BATTERY, AND STORAGE MEDIUM

CROSS-REFERENCE TO RELATED PATENT APPLICATIONS

This application is a National Stage Entry of International Application No. PCT/JP2014/068076, filed Jul. 7, 2014, which claims priority from Japanese Patent Application No. 2013-200774, filed Sep. 27, 2013. The entire contents of the above-referenced applications are expressly incorporated herein by reference.

TECHNICAL FIELD

The present invention relates to a storage battery management device, a storage battery, a method of managing a storage battery, and program.

BACKGROUND ART

There is a technique for managing the operation of a storage battery. Patent Document 1 discloses a distributed energy system control device capable of creating an optimum operation plan even when there are device specific changes due to air temperature, water temperature, or deterioration of the device.

The distributed energy system control device disclosed in Patent Document 1 includes a modeling operation plan creating unit, a measurement information storage unit, a device characteristic modeling unit, a device characteristic storage unit, an optimum operation plan creating unit, and a demand estimating unit. The modeling operation plan creating unit creates an operation plan on the basis of modeling operation plans of an energy generating device and an energy storage device which are set in advance. The measurement information storage unit stores measurement results of output characteristics of the device operated on the basis of the modeling operation plans. The device characteristic modeling unit models device characteristics on the basis of the stored output characteristics and stores the modeled device characteristics in the device characteristic storage unit. The optimum operation plan creating unit creates an optimum operation plan on the basis of the modeled device characteristics and demand predicted by the demand prediction unit.

Patent Document 2 discloses a charging and discharging management device for improving energy consumption performance and social environment performance of the entire electric power system on the basis of the behavior of consumers.

The charging and discharging management device disclosed in Patent Document 2 includes a charging and discharging reward information reception unit that receives, from a charging management central server, charging and discharging reward information in which rewards enjoyable by consumers' charging and discharging behavior and restrictions regarding the execution of charging and discharging are set, a calculation unit that creates a charging and discharging plan including a total amount of charge and a total amount of discharge in a certain time period and an estimated use start time of an electric car so that a reward is maximized, on the basis of the charging and discharging reward information, a charging and discharging instruction transmission unit that instructs the electric car to start and terminate charging and discharging according to the charging and discharging plan, a charging and discharging amount monitoring unit that monitors charging and discharging, and a charging and discharging execution result transmission unit that transmits, to the charging management central server, a charging and discharging execution result including individual identification information for identifying execution contents of charging and discharging and an individual by monitoring.

Patent Document 3 discloses a control device that can effectively use power using a storage battery. The control device acquires power rate information indicating a power rate which is different for each time period, and generates a schedule in which a period having a power rate lower than a rate threshold value is set as a charging period.

RELATED DOCUMENT

Patent Document

[Patent Document 1] Japanese Unexamined Patent Publication No. 2006-325336
[Patent Document 2] Japanese Unexamined Patent Publication No. 2011-50240
[Patent Document 3] Japanese Unexamined Patent Publication No. 2012-115003

SUMMARY OF THE INVENTION

Technical Problem

A rate plan of power supplied from a power supplier through an electric power system includes a rate plan in which one day is divided into two time periods of a daytime time period and a nighttime time period and a unit price in the daytime time period is set to be lower than a unit price in the nighttime time period. In the rate plan, power consumers consider suppressing purchasing power in the daytime. For example, a power consumer having a storage battery is supplied with power from an electric power system in the nighttime, charges the storage battery, and uses the power in the daytime, thereby allowing a power rate to be paid to a power supplier to be lowered (see Patent Document 3).

In general, the amount of power used by a power consumer in the daytime is greater than that in the nighttime, and a peak of power (power peak) which is supplied to the power consumer from an electric power system is shown in the daytime. When the power consumer suppresses the purchasing of power in the daytime according to the rate plan, a power supplier can cut the power peak shown in the daytime, and thus the stable supply of power is easily realized.

Incidentally, a power peak is shown in a specific time period in the daytime, for example, a time period between 13 o'clock and 17 o'clock in summertime. According to a rate plan in which a daytime time period is divided into a plurality of time periods and a unit price different for each time period is determined, it is considered that a power supplier can effectively cut a power peak. In addition, a power consumer having a storage battery can lower a power rate by properly using power charged in the storage battery and power supplied from an electric power system in accordance with a difference in unit price between time periods, in using power in a daytime time period. However, in the related art, there has not been a technique for appropriately controlling a discharging schedule from a storage battery on the basis of the rate plan.

An object of the present invention is to provide a new technique for controlling a discharging schedule from a storage battery.

Solution to Problem

According to the present invention, there is provided a storage battery management device, wherein the storage battery management device determines an upper limit of power discharged from a storage battery or an upper limit of an amount of power discharged from the storage battery for each of discharging time periods divided for each unit time, on the basis of remaining discharge capacity information indicating an amount of power that can be supplied to a load from the storage battery.

In addition, according to the present invention, there is also provided a storage battery that discharges power in accordance with the upper limit determined by the above-mentioned storage battery management device.

In addition, according to the present invention, there is also provided a method of managing a storage battery, the method including causing a computer to determine an upper limit of power discharged from the storage battery or an upper limit of an amount of power discharged from the storage battery for each of discharging time periods divided for each unit time, on the basis of remaining discharge capacity information indicating an amount of power that can be supplied to a load from the storage battery.

In addition, according to the present invention, there is also provided a program causing a computer to execute a process of determining an upper limit of power discharged from a storage battery or an upper limit of an amount of power discharged from the storage battery for each of discharging time periods divided for each unit time, on the basis of remaining discharge capacity information indicating an amount of power that can be supplied to a load from the storage battery.

Advantageous Effects of Invention

According to the present invention, it is possible to realize a new technique for controlling a discharging schedule from a storage battery.

BRIEF DESCRIPTION OF THE DRAWINGS

The above-described objects, other objects, features and advantages will be further apparent from the preferred exemplary embodiments described below, and the accompanying drawings as follows.

FIG. 6 is a schematic diagram illustrating an example of power purchasing price information according to the present exemplary embodiment.

FIG. 12 is a diagram illustrating an example of information for dividing a discharging time period into a first group and a second group.

DESCRIPTION OF EXEMPLARY EMBODIMENTS

Figure 1:
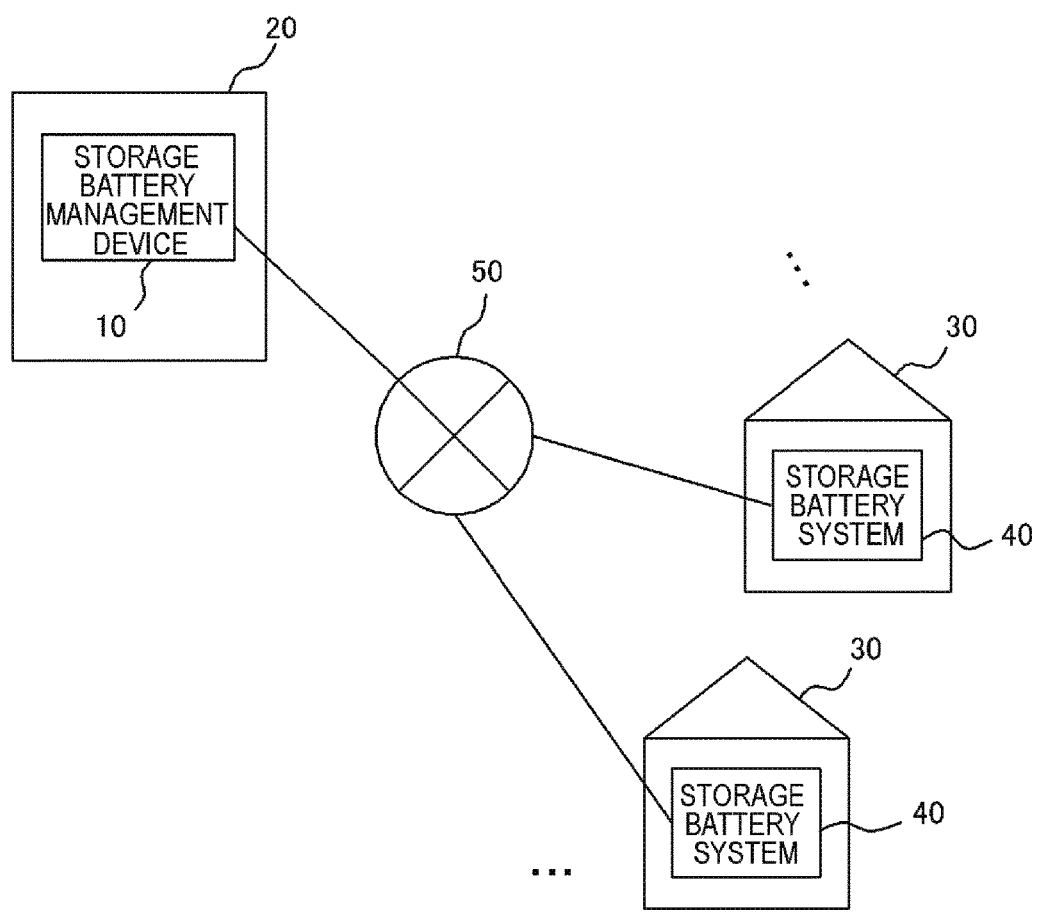
FIG. 1 is a diagram illustrating an application example of a storage battery management device according to the present exemplary embodiment.

Hereinafter, exemplary embodiments of the present invention will be described with reference to the accompanying drawings. Meanwhile, the same components are denoted by the same reference numerals, and a description thereof will not be repeated.

Application Example

First, an application example of a storage battery management device according to the present exemplary embodiment will be described. FIG. 1 is a diagram illustrating a first application example of a storage battery management device according to the present exemplary embodiment.

A storage battery management device 10 is provided inside a management center 20. The storage battery management device 10 is connected to a storage battery system 40 which is installed in a house or a facility of a power consumer 30 through a network 50 such as the Internet or a Local Area Network (LAN). The storage battery management device 10 communicates with the storage battery system 40 to perform transmission and reception of information, and manages the operation of the storage battery system 40. Specifically, the storage battery management device 10 generates a discharging schedule of the storage battery system 40. The storage battery system 40 discharges power charged in the system in accordance with the discharging schedule generated by the storage battery management device 10.

Figure 2:
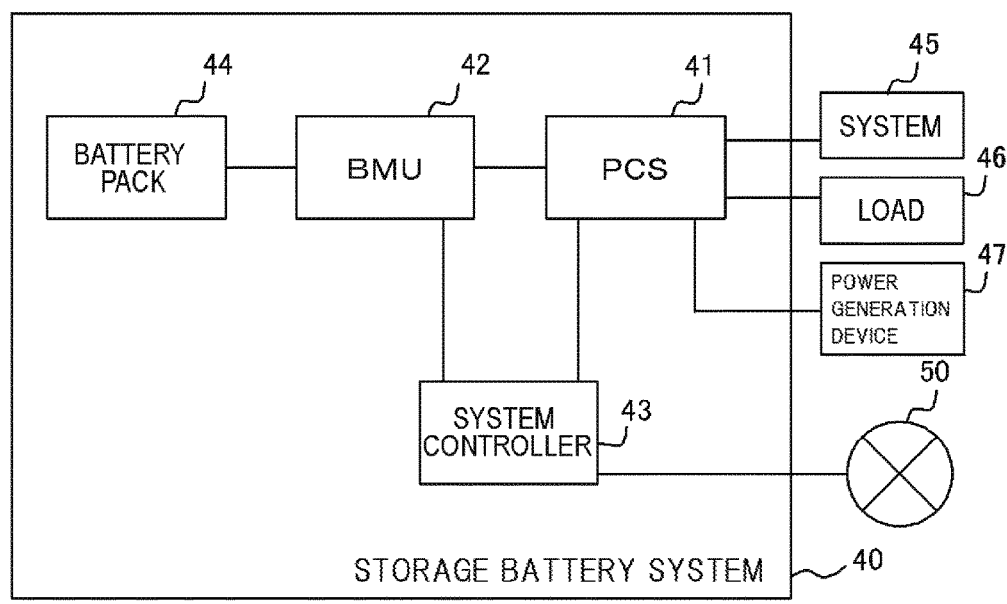
FIG. 2 is a diagram illustrating an example of a functional block diagram of a storage battery system according to the present exemplary embodiment.

Here, FIG. 2 illustrates an example of a functional block diagram of the storage battery system 40. As illustrated in the drawing, the storage battery system 40 includes one or a plurality of battery packs 44, a Battery Management Unit (BMU) 42, a Power Conditioning System (PCS) 41, and a system controller 43.

The battery pack 44 includes a plurality of battery cells that are connected to each other in series and/or in parallel, and is configured to charge power. The battery pack 44 is a secondary battery and is, for example, a lithium ion secondary battery, a lead storage battery, a nickel metal hydride battery, or the like.

The BMU 42 protects and controls the battery pack 44. The PCS 41 is located between the BMU 42, and the electric power system 45, a load 46, and a power generation device 47, performs DC/AC conversion of power, and adjusts a voltage and a frequency. The electric power system 45 is a system which is managed by a power supplier (for example, a power company or the like) and supplies power to a power consumer. The power generation device 47 is a device which is managed by each of power consumers, and the type thereof is not particularly limited. For example, the power generation device 47 may be a device that generates power, using natural energy such as sunlight. The system controller 43 unitarily manages the BMU 42 and the PCS 41. The system controller 43 is connected to the network 50 such as the Internet or a LAN, and transmits and receives data to and from the management center 20 that manages the storage battery system 40.

Meanwhile, in FIG. 2, the battery pack 44, the BMU 42, the PCS 41, and the system controller 43 are separately described, but this indicates that these four modules are configured so as to be logically separated from each other. These modules may be configured so as to be physically separated from each other, or at least some of them may be integrally formed by any combination. For example, the battery pack 44 and the BMU 42 may be installed in a single housing.

Figure 3:
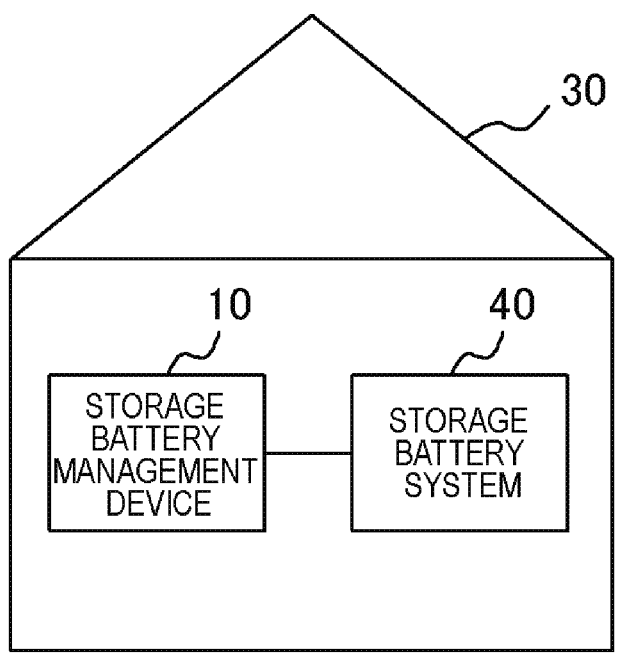
FIG. 3 is a diagram illustrating an application example of a storage battery management device according to the present exemplary embodiment.

FIG. 3 is a diagram illustrating a second application example of a storage battery management device according to the present exemplary embodiment. As illustrated in the drawing, the storage battery management device 10 may be installed in a house, a facility, or the like of the power consumer 30.

Hardware Configuration

The storage battery management device 10 according to the present exemplary embodiment is implemented by any combination of hardware and software based on a Central Processing Unit (CPU), a memory, a program (including a program stored in advance in the memory from the stage of shipping of an apparatus, and a program downloaded from a storage medium such as a Compact Disc (CD), a server on the Internet, or the like) which is loaded on the memory, a storage unit such as a hard disk storing the program, and an interface for network connection, which are of any computer. In addition, those skilled in the art understand that various modifications can be made to the implementation method thereof and the apparatus.

Figure 4:
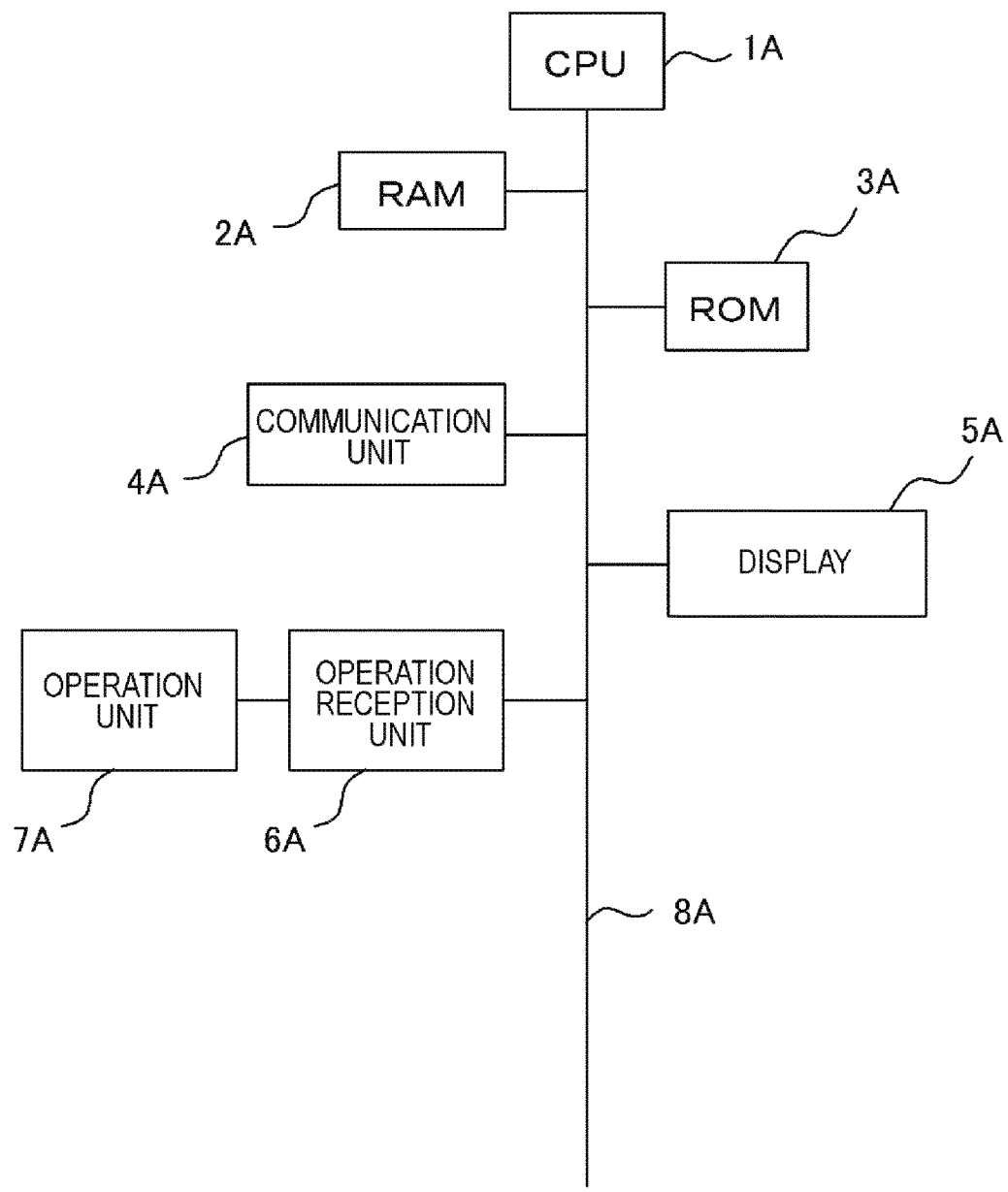
FIG. 4 is a conceptual diagram illustrating an example of a hardware configuration of a storage battery management device according to the present exemplary embodiment.

FIG. 4 is a conceptual diagram illustrating an example of a hardware configuration of the storage battery management device 10 according to the present exemplary embodiment. As illustrated in the drawing, the storage battery management device 10 according to the present exemplary embodiment includes, for example, a CPU 1A, a Random Access Memory (RAM) 2A, a Read Only Memory (ROM) 3A, a communication unit 4A, a display 5A, an operation reception unit 6A, an operation unit 7A, and the like which are connected to each other through a bus 8A. Meanwhile, although not shown in the drawing, the storage battery system may include other components such as a microphone, a speaker, and an auxiliary storage.

The CPU 1A controls the overall computer of the storage battery management device 10 together with the components. The ROM 3A includes an area in which programs and various application programs for operating the computer, various pieces setting data used when the programs operate, and the like are stored. The RAM 2A includes an area, such as a work area for operating programs, in which data is temporarily stored.

The operation unit 7A includes operation keys, operation buttons, switches, a jog dial, a touch pad, a touch panel integrated with a display, and the like. The operation reception unit 6A receives a user's input performed by a user operating the operation unit 7A.

The communication unit 4A can be connected to a network such as the Internet or a LAN. In addition, the communication unit 4A can communicate with an external device by one-to-one connection. The communication unit 4A can be connected to an external device or a network in a wired manner and/or using any wireless communication technique (short range radio communication, wireless LAN communication, or the like).

The display 5A includes a Light Emitting Diode (LED) display, a liquid crystal display, an organic electro luminescence (EL) display, and the like.

First Exemplary Embodiment

A storage battery management device according to the present exemplary embodiment determines an upper limit of power discharged from a storage battery or an upper limit of the amount of power discharged from the storage battery for each of discharging time periods divided for each unit time, on the basis of remaining discharge capacity information indicating the amount of power that can be supplied to a load from the storage battery. The storage battery management device according to the present exemplary embodiment can determine the upper limit on the basis of information regarding power supplied to the storage battery and the remaining discharge capacity information. The information regarding the power is, for example, power purchasing price information indicating a power purchasing price for each time period.

Figure 5:
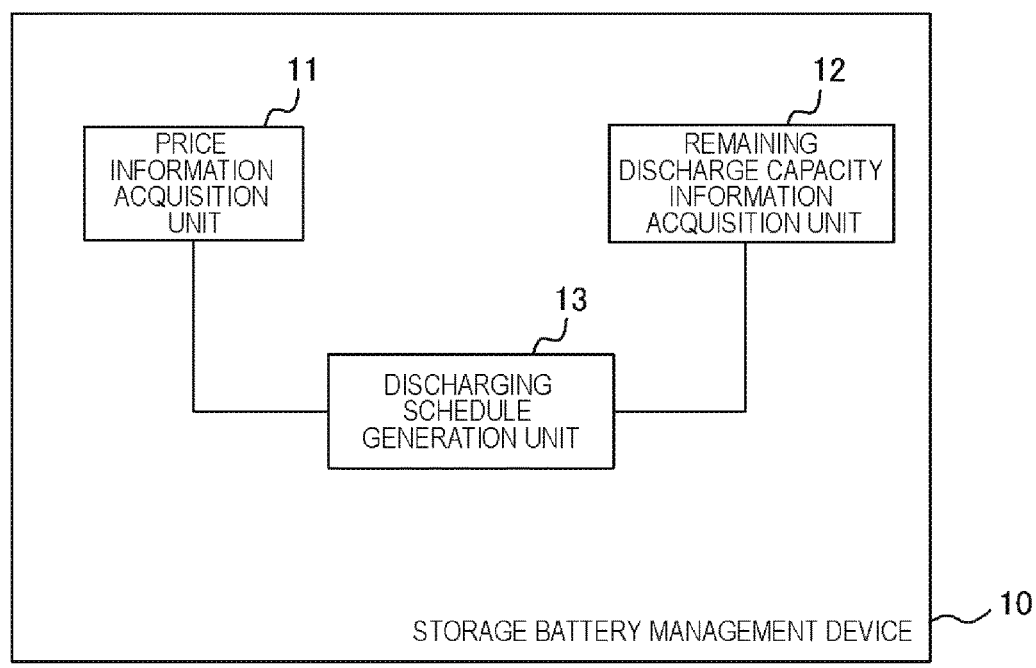
FIG. 5 is a diagram illustrating an example of a functional block diagram of a storage battery management device according to the present exemplary embodiment.

FIG. 5 illustrates an example of a functional block diagram of the storage battery management device 10 according to the present exemplary embodiment. As illustrated in the drawing, the storage battery management device 10 includes a price information acquisition unit 11, a remaining discharge capacity information acquisition unit 12, and a discharging schedule generation unit 13.

The price information acquisition unit 11 acquires power purchasing price information indicating a power purchasing price for each time period of power (power which is sold by a power supplier) which is supplied from the electric power system 45. FIG. 6 illustrates an example of power purchasing price information. In the power purchasing price information shown in the drawing, one day is divided into six time periods. A price is set for each time period. In this manner, the power purchasing price information may be information in which a daytime time period is divided into a plurality of time periods and a price is set for each time period. Meanwhile, "M o'clock to M+1 o'clock" shown in the drawing is set to be a time period that includes M o'clock and does not include M+1 o'clock (the same applies hereinafter).

The number of time periods obtained by dividing one day and a price for each time period can be appropriately set. For example, the number of time periods and the price can be appropriately set in accordance with the number of storage battery systems to be controlled, the storage capacity thereof, a consumer's setting, or the like. In general, a price in a daytime time period in which the amount of power used is large tends to be high, and a price in a nighttime time period in which the amount of power used is small tends to be low. In addition, a unit "yen/kwh" of a power purchasing price shown in the drawing is an example, and is not limited thereto. The power purchasing price information may be different for each specific day. For example, power purchasing price information for days from Monday to Friday, power purchasing price information for Saturday, and power purchasing price information for Sunday and holidays may be present. In addition, the contents of the pieces of power purchasing price information may be updated at a predetermined timing (annually, semiannually, monthly, weekly, daily, or the like). The pieces of information are matters that are generally determined by a power supplier.

A unit of making the price information acquisition unit 11 acquire power purchasing price information is not particularly limited. For example, a user may acquire power purchasing price information using a predetermined unit (for example, may acquire power purchasing price information by accessing a server providing the power purchasing price information through the network 50 using its own terminal device), and may input the acquired power purchasing price information to the storage battery management device 10. The price information acquisition unit 11 may acquire the power purchasing price information which is input to the storage battery management device 10 in this manner. Alternatively, the price information acquisition unit 11 may store address information of an external device (for example, a server of a power supplier) and may itself access the external device at a predetermined timing to thereby acquire the power purchasing price information.

Referring back to FIG. 5, the remaining discharge capacity information acquisition unit 12 acquires remaining discharge capacity information indicating the amount of power that can be supplied to the load 46 from the storage battery. The wording "storage battery" as used herein refers to a storage battery included in the storage battery system 40. The discharging schedule generation unit 13 to be described below creates a discharging schedule for discharging power having an amount indicated by the remaining discharge capacity information according to a plan.

For example, the storage battery may be operated in a charging and discharging cycle in which the storage battery is charged to a first level (for example, 100% State Of Charge (SOC)) in the nighttime, uses the amount of power according to the operation state of the load 46 in the daytime, and is charged again to the first level (for example, 100% SOC) in the nighttime. In this case, the remaining discharge capacity information acquisition unit 12 may acquire information indicating the amount of power at a point in time when the storage battery is charged with power to the first level (for example, 100% SOC), as remaining discharge capacity information. For example, the storage battery management device 10 may store in advance information indicating the amount of power at a point in time when the storage battery is charged with power to the first level, as characteristics of the storage battery system 40. The remaining discharge capacity information acquisition unit 12 may acquire the information.

As another example, the remaining discharge capacity information acquisition unit 12 may request remaining discharge capacity information from the storage battery system 40 at a predetermined timing (for example, 5 o'clock every day). When the storage battery system 40 acquires the request, the storage battery system returns, for example, information (for example, a value of the amount of power, a voltage value, a current value, or the like) which indicates the amount of power charged in a storage battery of the system at the point in time, information indicating the amount of power at a point in time when the storage battery is charged to the first level (for example, 100% SOC), or the like, to the remaining discharge capacity information acquisition unit 12 as remaining discharge capacity information.

The discharging schedule generation unit 13 generates a discharging schedule in which an upper limit of power (=current×voltage) which is discharged from a storage battery or an upper limit of the amount of power (=current×voltage×time) which is discharged from a storage battery (hereinafter, the upper limits may be collectively referred to as simply "upper limit") is determined for each of a plurality of discharging time periods divided for each unit time (matter of design. For example, 15 minutes, 30 minutes, 1 hour, or the like), using the power purchasing price information and the remaining discharge capacity information. The time of the upper limit of the amount of power may be in a unit time of the discharging time period, or may be 1 hour, 1 minute, 1 second, or the like. A maximum value (maximum amount of power) of the amount of power that can be discharged in each discharging time period is determined by the determination of the upper limit. When an upper limit of power is determined, the amount of power discharged when discharging is continuously performed at the power of the upper limit in a unit time of a discharging time period is set to be a maximum amount of power. When an upper limit of the amount of power is determined, the upper limit is set to be a maximum amount of power.

The discharging schedule generation unit 13 can determine a larger upper limit for a discharging time period having a relatively high power purchasing price. For example, when a first discharging time period and a second discharging time period having a power purchasing price lower than that for the first discharging time period are present, the discharging schedule generation unit 13 can determine a larger upper limit for the first discharging time period than for the second discharging time period. Meanwhile, the discharging schedule generation unit 13 can determine the same upper limit for the first discharging time period and the second discharging time period. For example, the discharging schedule generation unit 13 may determine an upper limit, which is larger than 0, for a discharging time period having a relatively high power purchasing price, and may determine 0 to be an upper limit for a discharging time period having a relatively low power purchasing price.

Meanwhile, the discharging schedule generation unit 13 may generate a discharging schedule so that a total of maximum amounts of power determined on the basis of upper limits determined for respective discharging time periods does not exceed a predetermined amount of power (hereinafter, a "discharging permission power amount") which is determined on the basis of remaining discharge capacity information. The discharging permission power amount may be the amount of power itself which is indicated by the remaining discharge capacity information, or may be a predetermined amount (for example, 80%, 70%, or the like) in the amount of power indicated by the remaining discharge capacity information. In the latter case, it is possible to generate a discharging schedule in which a fixed amount of power (for example, 20%, 30%, or the like) can be charged in a storage batter at all times, for example, for emergency.

Here, a specific example of a discharging schedule generated by the discharging schedule generation unit 13 will be described.

For example, it is assumed that the price information acquisition unit 11 has acquired the power purchasing price information illustrated in FIG. 6. In the power purchasing price information, it is assumed that a power purchasing price is lower in order of time periods between 13 o'clock and 17 o'clock, between 11 o'clock and 13 o'clock, and between 17 o'clock and 21 o'clock and power purchasing prices in the remaining time periods are lower. In this case, for example, the discharging schedule generation unit 13 can preferentially determine an upper limit which is larger than 0 for a discharging time period having a relatively high power purchasing price and can determine 0 to be an upper limit for a discharging time period having a relatively low power purchasing price to thereby generate a discharging schedule as illustrated in FIG. 7.

Figure 7:
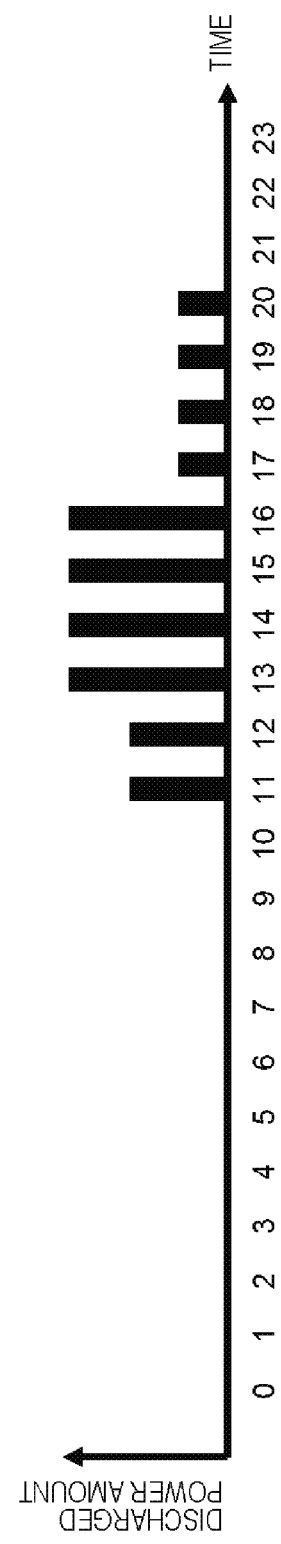
FIG. 7 is a schematic diagram illustrating an example of a discharging schedule according to the present exemplary embodiment.

In the discharging schedule illustrated in FIG. 7, a horizontal axis represents a time, and a vertical axis represents the amount of power discharged indicating an upper limit for permitting discharging from a storage battery. Meanwhile, it is possible that the vertical axis represents discharged power instead of the amount of power discharged (the same is true of FIGS. 10, 11, 13, (2) of 15, (2) of 17, (2) of 19, (2) of 20, and 21). In the case of an example shown in the drawing, a time period between M o'clock and M+1 o'clock (M is an integer of 0 to 23) is set to be one discharging time period. An upper limit which is larger than 0 is determined for a time period between 11 o'clock and 21 o'clock, and 0 is determined to be an upper limit for the other time periods. Meanwhile, a specific value of the upper limit which is larger than 0, and which is determined for each discharging time period is a matter of design in the present exemplary embodiment. However, for example, the specific value may be determined so that a total of maximum amounts of power determined on the basis of the upper limits determined for the respective discharging time periods does not exceed a discharging permission power amount determined on the basis of remaining discharge capacity information.

Figure 8:
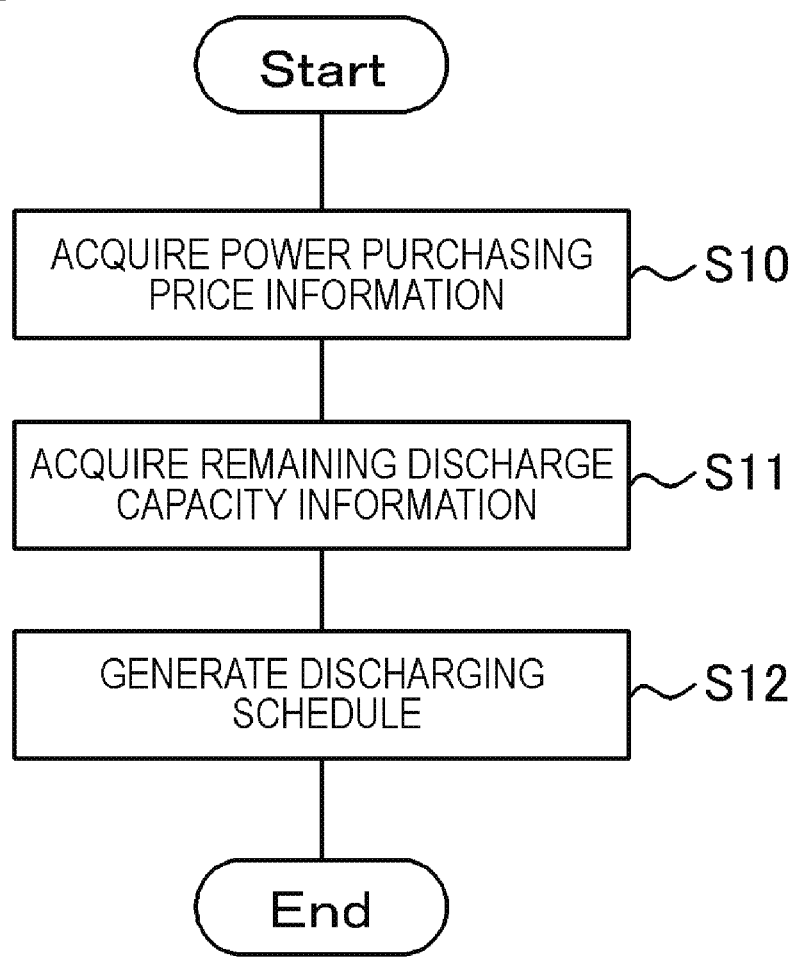
FIG. 8 is a flow chart illustrating an example of a flow of processing of a storage battery management device according to the present exemplary embodiment.

Here, an example of a flow of processing of the storage battery management device 10 according to the present exemplary embodiment will be described with reference to a flow chart of FIG. 8.

In S10, the price information acquisition unit 11 acquires power purchasing price information indicating a power purchasing price for each time period of power supplied from an electric power system. In S11, the remaining discharge capacity information acquisition unit 12 acquires remaining discharge capacity information indicating the amount of power that can be supplied to a load from a storage battery. Meanwhile, the order of S11 and S12 may be reversed.

In S13, the discharging schedule generation unit 13 generates a discharging schedule in which an upper limit of power discharged from a storage battery or an upper limit of the amount of power is determined for each of a plurality of discharging time periods obtained by division for each unit time, using power purchasing price information and remaining discharge capacity information.

The generated discharging schedule is transmitted to the storage battery system 40 from the storage battery management device 10. The storage battery system 40 having acquired the discharging schedule controls the discharging of the storage battery in accordance with the discharging schedule.

For example, when power is required to be supplied to the load 46 in a discharging time period for which an upper limit is 0, the storage battery system 40 is supplied with power from the electric power system 45 and supplies the power to the load 46. On the other hand, when power is required to be supplied to the load 46 in a discharging time period for which an upper limit is larger than 0, the storage battery system 40 supplies power charged in a storage battery (battery pack 44) to the load 46. For example, power charged in the storage battery (battery pack 44) is supplied to the load 46 within a range in which the amount of power does not exceed an upper limit of power in the discharging time period which is set in the discharging schedule, and the shortage of power is supplied from the electric power system 45 and is supplied to the load 46. As another example, power is not supplied from the electric power system 45 until the amount of power reaches an upper limit of the amount of power in the discharging time period which is set in the discharging schedule, and power charged in the storage battery (battery pack 44) is supplied to the load 46. When the amount of power discharged from the storage battery (battery pack 44) reaches an upper limit, power is not thereafter discharged from the storage battery (battery pack 44) in the discharging time period, and power is supplied from the electric power system 45 and is supplied to the load 46. In this case, an accumulated value of the amount of power supplied to the load 46 from the storage battery (battery pack 44) in each discharging time period is monitored.

According to the above-described exemplary embodiment, it is possible to realize a new technique for controlling a discharging schedule from a storage battery.

That is, according to the present exemplary embodiment, it is possible to generate a discharging schedule in which an upper limit of power discharged from a storage battery or the amount of power discharged is specified for each discharging time period, and to cause the storage battery system 40 to discharge power in accordance with the discharging schedule. According to the present exemplary embodiment, it is possible to discharge power charged in the storage battery according to a plan.

In addition, according to the present exemplary embodiment, it is possible to generate a discharging schedule in which a larger upper limit is determined in a discharging time period having a relatively high power purchasing price, and to cause the storage battery system 40 to discharge power in accordance with the discharging schedule. According to the present exemplary embodiment, there are less opportunities to receive the supply of power from the electric power system 45 in a discharging time period having a relatively high power purchasing price than in a discharging time period having a relatively low power purchasing price. As a result, it is possible to reduce an inconvenience in that power is purchased from a power supplier in a discharging time period having a high power purchasing price.

In addition, according to the present exemplary embodiment, it is possible to generate a discharging schedule so that a total of maximum amounts of power determined on the basis of upper limits determined for respective discharging time periods does not exceed a predetermined amount of power (discharging permission power amount) which is determined on the basis of remaining discharge capacity information, and to cause the storage battery system 40 to discharge power in accordance with the discharging schedule. According to the present exemplary embodiment, in a discharging time period for which an upper limit which is larger than 0 is determined, a maximum amount of power determined on the basis of the upper limit is necessarily charged in a storage battery, which does not result in a situation in which there is no remaining power capacity of the storage battery in the discharging time period. That is, in a discharging time period for which an upper limit which is larger than 0 is determined, it is positively possible to supply power from the storage battery to the load 46 by using a maximum amount of power determined on the basis of the upper limit as a maximum amount. As a result, it is possible to reliably reduce an inconvenience in that power is purchased from a power supplier in a discharging time period having a high power purchasing price. Meanwhile, an alarm may be issued in a case of use such as an excess of an upper limit of power supplied to a load from a storage battery in a discharging time period.

In addition, according to the present exemplary embodiment, it is possible to generate a discharging schedule by setting the discharging permission power amount as a predetermined amount (for example, 80%, 70%, or the like) in the amount of power indicated by remaining discharge capacity information and to cause the storage battery system 40 to discharge power in accordance with the discharging schedule. According to the present exemplary embodiment, it is possible to charge a fixed amount of power (for example, 20%, 30%, or the like) in a storage battery at all times, for example, for emergency.

Second Exemplary Embodiment

An example of a functional block diagram of a storage battery management device 10 according to the present exemplary embodiment is illustrated in FIG. 5, similar to the first exemplary embodiment. Configurations of a price information acquisition unit 11 and a remaining discharge capacity information acquisition unit 12 are the same as those in the first exemplary embodiment.

The present exemplary embodiment is different from the first exemplary embodiment in that a discharging schedule generation unit 13 gives a priority rank to each of a plurality of discharging time periods so that a priority rank of a discharging time period having a high power purchasing price is high and generates a discharging schedule so that an upper limit for a first discharging time period is set to be equal to or larger than an upper limit for a second discharging time period having a priority rank lower than that of the first discharging time period. Hereinafter, the priority rank will be referred to as a "discharging priority rank". Other configurations of the discharging schedule generation unit 13 are the same as those in the first exemplary embodiment.

Hereinafter, a description will be given of (1) a process in which the discharging schedule generation unit 13 gives a discharging priority rank to each of a plurality of discharging time periods and (2) a process in which the discharging schedule generation unit 13 determines an upper limit for a plurality of discharging time periods using a discharging priority rank.

Figure 9:
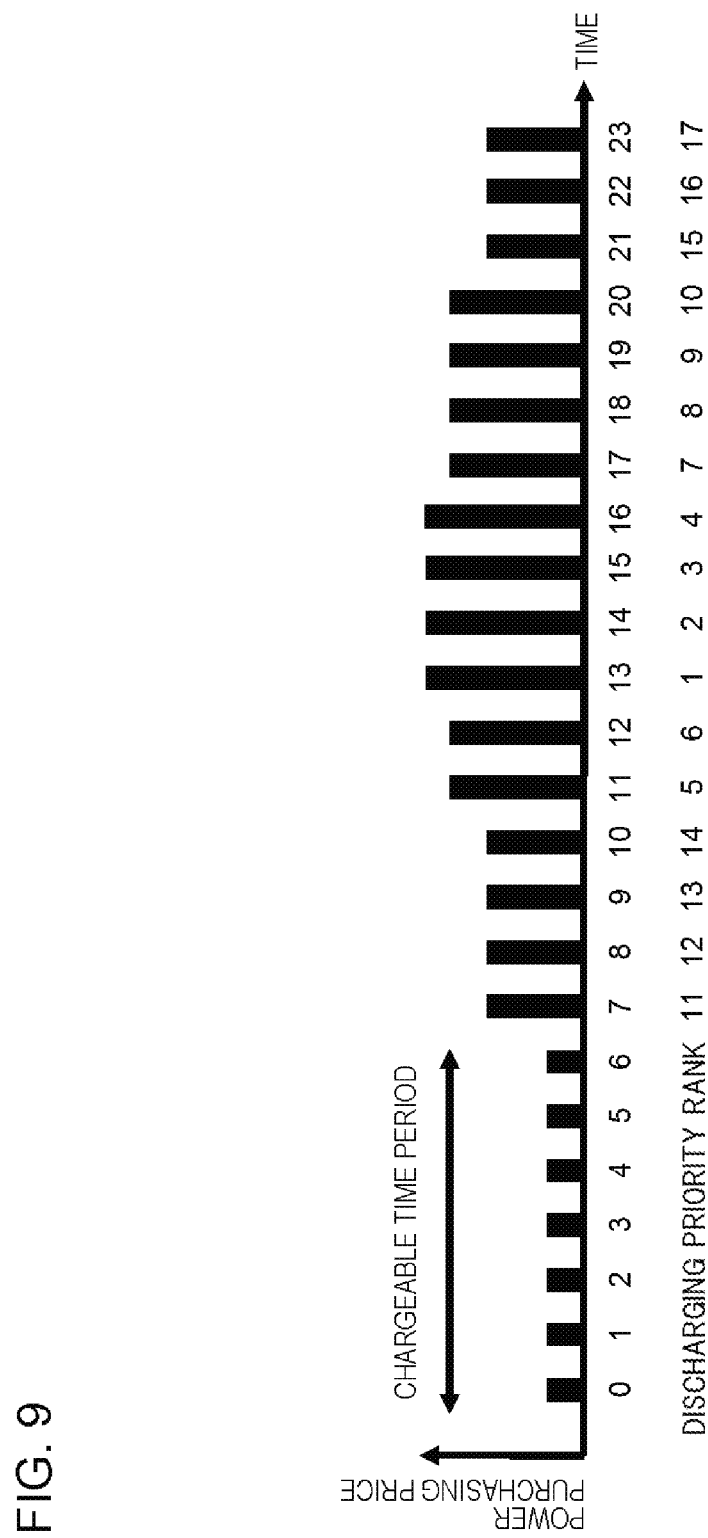
FIG. 9 is a diagram illustrating a configuration of a discharging schedule generation unit according to the present exemplary embodiment.

First, (1) the process in which the discharging schedule generation unit 13 gives a discharging priority rank to each of a plurality of discharging time periods will be described with reference to FIG. 9. FIG. 9 shows the magnitude of a power purchasing price in each time period with the horizontal axis representing a time and the vertical axis representing a power purchasing price. The degree of the power purchasing price in each time period is based on power purchasing price information acquired by a price information acquisition unit 11. Meanwhile, in a case of the example illustrated in the drawing, a time period between M o'clock and M+1 o'clock is set to be one discharging time period.

The discharging schedule generation unit 13 specifies a power purchasing price in each time period on the basis of the power purchasing price information, and then first determines a chargeable time period in which power is supplied from an electric power system 45 and is charged in a storage battery. The length of the chargeable time period to be is a matter of design. For example, the discharging schedule generation unit 13 can set time periods having a predetermined length which are selected in order of a time period having a low power purchasing price, as chargeable time periods. In this manner, it is possible to charge a storage battery with power in a time period having a low power purchasing price. In a case of the example illustrated in FIG. 9, the discharging schedule generation unit 13 sets a time between 0 o'clock and 7 o'clock which is a time period having a predetermined length (7 hours) selected in order of a low power purchasing price, as a chargeable time period. When such a discharging schedule is generated, a storage battery system 40 is supplied with power from the electric power system 45 in the chargeable time period and charges the storage battery with power.

The discharging schedule generation unit 13 determines a chargeable time period, divides a time period except for the chargeable time period into a plurality of discharging time periods, and gives a discharging priority rank to each of the plurality of discharging time periods. Specifically, the discharging schedule generation unit 13 divides a time period except for the chargeable time period into a plurality of discharging time periods for each unit time which is set in advance, and gives a discharging priority rank to each of the plurality of discharging time periods so that a discharging priority rank of a discharging time period having a high power purchasing price is high. Meanwhile, it is possible to apply various methods of giving a discharging priority rank to discharging time periods having the same power purchasing price. For example, a discharging priority rank of a discharging time period at the prior time may be raised. In addition, when a plurality of time periods having different power purchasing prices are included in a certain discharging time period, a priority rank may be given to each of the plurality of time periods by setting a low power purchasing price, a high power purchasing price, an average value thereof, or the like as a power purchasing price in the discharging time period. According to the process, discharging priority ranks as illustrated in FIG. 9 are given to the plurality of discharging time periods. Meanwhile, in the discharging priority ranks shown in the drawing, the smaller the numerical value is, the higher the priority thereof is (the same is true of all of the following exemplary embodiments).

Next, (2) the process in which the discharging schedule generation unit 13 determines an upper limit for a plurality of discharging time periods using a discharging priority rank will be described with reference to FIG. 10.

The discharging schedule generation unit 13 determines upper limits which are larger than 0 in order from a discharging time period having a high discharging priority rank so that a total of maximum amounts of power determined on the basis of upper limits determined for respective discharging time periods does not exceed a discharging permission power amount determined on the basis of remaining discharge capacity information. When a total of maximum amounts of power determined on the basis of the upper limits determined for the respective discharging time periods exceeds the discharging permission power amount, 0 is determined as an upper limit with respect to the remaining discharging time periods.

For example, an upper limit which is larger than 0 may be the maximum power that can be discharged by a storage battery while securing safety in terms of the performance thereof or a maximum amount of power (hereinafter, referred to as a "discharging maximum value") that can be discharged per unit time. The storage battery management device 10 may store in advance information indicating the discharging maximum value of the storage battery as characteristics of the storage battery system 40. The discharging maximum value is determined, for example, by a manufacturer of the storage battery system 40. The discharging schedule generation unit 13 may generate a discharging schedule using the information. In this case, the discharging schedule generation unit 13 may determine either the discharging maximum value or a predetermined value (for example, 0) which is smaller than the discharging maximum value as an upper limit with respect to each discharging time period. In a case of the example illustrated in FIG. 10, the discharging schedule generation unit 13 determines either a discharging maximum value or 0 as an upper limit with respect to each discharging time period.

When discharging maximum values (upper limits) are determined in order from a discharging time period having a high discharging priority rank in a case where a discharging permission power amount is indivisible by the discharging maximum value, the remainder is left. The discharging schedule generation unit 13 may determine the remainder to be used for discharging priority time period with the next discharging priority rank, or may ignore the remainder.

Meanwhile, an upper limit which is larger than 0 may be determined on the basis of power purchasing price information. For example, the discharging schedule generation unit 13 may set a predetermined number (a matter of design) of discharging time periods from a high discharging priority rank to be discharging time periods in which an upper limit which is larger than 0 is determined. In addition, a discharging permission power amount may be divided proportionally in accordance with a power purchasing price in a discharging time period for which an upper limit larger than 0 is set to be determined. In addition, 0 may be determined as an upper limit with respect to a discharging time period for which an upper limit larger than 0 is set not to be determined. In this case, as illustrated in FIG. 11, an upper limit in a discharging time period for which an upper limit which is larger than 0 is determined is set to be a value depending on a power purchasing price in each discharging time period.

Figure 10:
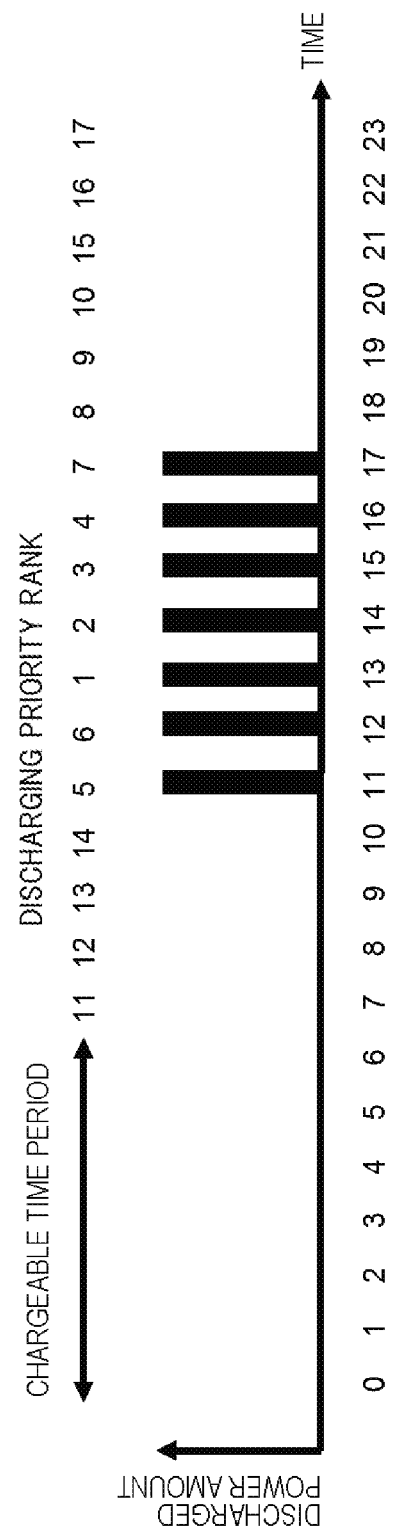
FIG. 10 is a diagram illustrating a configuration of a discharging schedule generation unit according to the present exemplary embodiment.
Figure 11:
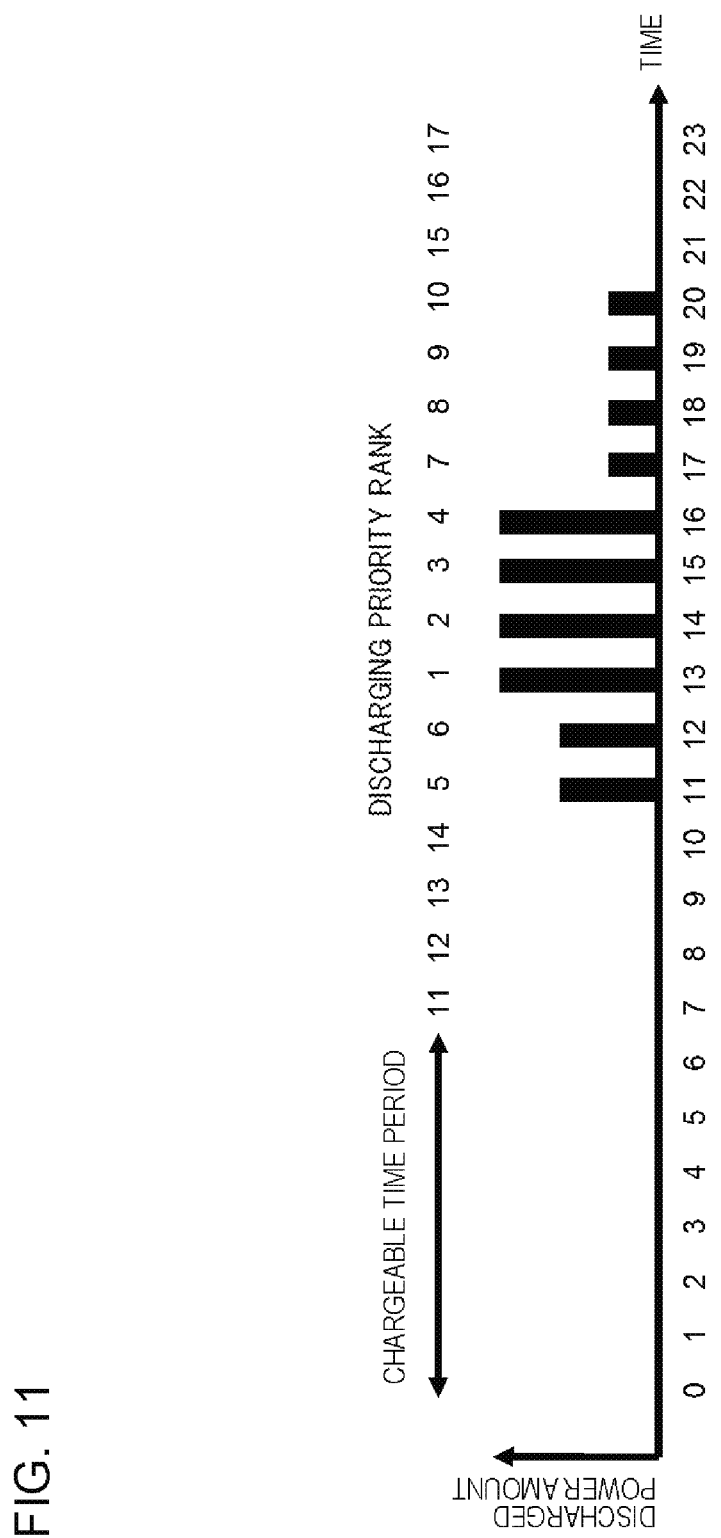
FIG. 11 is a diagram illustrating a configuration of a discharging schedule generation unit according to the present exemplary embodiment.

In both cases of FIGS. 10 and 11, an upper limit in a first discharging time period is set to be equal to or larger than an upper limit in a second discharging time period having a priority rank lower than that of the first discharging time period.

According to the above-described exemplary embodiment, it is possible to realize the same operation and effect as those in the first exemplary embodiment.

In addition, according to the present exemplary embodiment, it is possible to give a discharging priority rank to each of a plurality of discharging time periods and to generate a discharging schedule on the basis of the discharging priority ranks. According to the present exemplary embodiment, it is possible to efficiently generate the discharging schedule.

In addition, according to the present exemplary embodiment, it is possible to generate a discharging schedule so that an upper limit in a first discharging time period is set to be equal to or greater than an upper limit in a second discharging time period having a priority rank lower than that of the first discharging time period. According to the present exemplary embodiment, there are less opportunities to receive the supply of power from the electric power system 45 in a discharging time period having a relatively high discharging priority rank (having a relatively high power purchasing price) than in a discharging time period having a relatively low discharging priority rank (having a relatively low power purchasing price). As a result, it is possible to reduce an inconvenience in that power is purchased from a power supplier in a discharging time period having a high power purchasing price.

In addition, according to the present exemplary embodiment, it is possible to generate a discharging schedule in which the maximum power that can be discharged by a storage battery or a maximum amount of power (discharging maximum value) that can be discharged per unit time is determined as an upper limit. According to the present exemplary embodiment, in a discharging time period having a relatively high power purchasing price, it is possible to discharge as large amount of power as possible in terms of the performance of the storage battery. As a result, it is possible to further reduce an inconvenience in that power is purchased from a power supplier in a discharging time period having a relatively high power purchasing price.

Third Exemplary Embodiment

A storage battery management device 10 according to the present exemplary embodiment can generate a discharging schedule for allowing power corresponding to a discharging permission power amount to be completely used up.

The discharging schedule is a schedule in which an upper limit of discharging from a storage battery is set, and an actual amount of discharge according to the schedule is set to be equal to or less than the upper limit. When the amount of power to be supplied to a load 46 in a certain discharging time period is smaller than an upper limit which is set in the discharging schedule, power of the storage battery is not discharged up to the full upper limit in the discharging time period.

When a discharging time period in which power is not discharged up to a maximum amount of power is generated in a case where a discharging schedule is generated so that a total of maximum amounts of power determined on the basis of upper limits determined for respective discharging time periods does not exceed a discharging permission power amount, the discharging permission power amount is not used up at a point in time when a discharging process according to the discharging schedule is terminated (for example, a point in time of 24 o'clock in a case of a discharging schedule from 0 o'clock to 24 o'clock), which may result in a situation in which some amount of power remains.

In this case, an inconvenience may occur in that, despite power, charged in a storage battery in a time period having a low power purchasing price, remaining without being used up, power is supplied from an electric power system 45 and thus the power is purchased in a discharging time period for which 0 is allocated as an upper limit (time period having a power purchasing price higher than that in a chargeable time period).

In order to eliminate such a defect, the storage battery management device 10 according to the present exemplary embodiment generates a discharging schedule for allowing power corresponding to a discharging permission power amount to be used up.

Incidentally, power corresponding to a discharging permission power amount being used up is realized by generating a discharging schedule so that a total of maximum amounts of power determined on the basis of upper limits determined for respective discharging time periods greatly exceeds the discharging permission power amount. For example, power corresponding to a discharging permission power amount being used up can be realized by determining a value sufficiently larger than 0 as an upper limit for all of the discharging time periods.

However, in order to suppress a power charge to be paid to a power supplier, it is necessary to increase the amount of power discharged from a storage battery in a discharging time period having a relatively high power purchasing price and to decrease the amount of power discharged from the storage battery in a discharging time period having a relatively low power purchasing price. When a value sufficiently larger than 0 is determined as an upper limit for a large number of discharging time periods, an inconvenience may occur in that power charged in a storage battery is used up in a discharging time period having a relatively low power purchasing price and power does not remain in the storage battery in a discharging time period having a relatively high power purchasing price.

Consequently, the storage battery management device 10 according to the present exemplary embodiment generates a discharging schedule capable of discharging power in a discharging time period having a relatively high power purchasing price and completely using up power corresponding to a discharging permission power amount.

An example of a functional block diagram of the storage battery management device 10 according to the present exemplary embodiment is illustrated in FIG. 5, similar to the first exemplary embodiment. Configurations of a price information acquisition unit 11 and a remaining discharge capacity information acquisition unit 12 are the same as those in the first exemplary embodiment. Hereinafter, a configuration of a discharging schedule generation unit 13 will be described. Meanwhile, only differences from the first and second exemplary embodiments will be described, and a description of common portions will not be repeated.

The discharging schedule generation unit 13 divides a plurality of discharging time periods into a first group in which discharging time periods having a relatively high power purchasing price are collected and a second group in which discharging time periods having a relatively low power purchasing price are collected. The discharging time periods included in the first group are time periods in which power is desired to be necessarily discharged from a storage battery in order to suppress a power charge to be paid to a power supplier. On the other hand, the discharging time periods included in the second group are time periods having a power purchasing price which is higher than that in a chargeable time period but is lower than those in the discharging time periods of the first group, and are time periods in which priority of discharging of a storage battery is lower than those in the discharging time periods of the first group but in which power of the storage battery is preferably discharged as long as there is a remaining power capacity. Meanwhile, the discharging time period is a time period other than the chargeable time period described in the second exemplary embodiment.

For example, the discharging schedule generation unit 13 may divide a plurality of discharging time periods into a first group having a relatively high power purchasing price and a second group having a relatively low power purchasing price in accordance with a standard, as illustrated in FIG. 12, which is stored in advance.

After the division into groups, the discharging schedule generation unit 13 generates a discharging schedule so that the sum of a first total and a second total does not exceed a discharging permission power amount. The first total is a total of maximum amounts of power (maximum values of the amounts of power that can be discharged in respective discharging time periods) which are determined on the basis of upper limits determined for the respective discharging time periods included in the first group. The second total is a total of maximum amounts of power determined on the basis of upper limits determined for the respective discharging time periods which are the discharging time periods included in the second group, and which are temporally prior to at least one discharging time period included in the first group.

In addition, the discharging schedule generation unit 13 generates a discharging schedule so that the sum of a third total, the first total, and the second total is set to be equal to or larger than the discharging permission power amount. The third total is a total of maximum amounts of power determined on the basis of upper limits determined for the respective discharging time periods which are the discharging time periods included in the second group, and which are temporally after all of the discharging time periods included in the first group.

Figure 13:
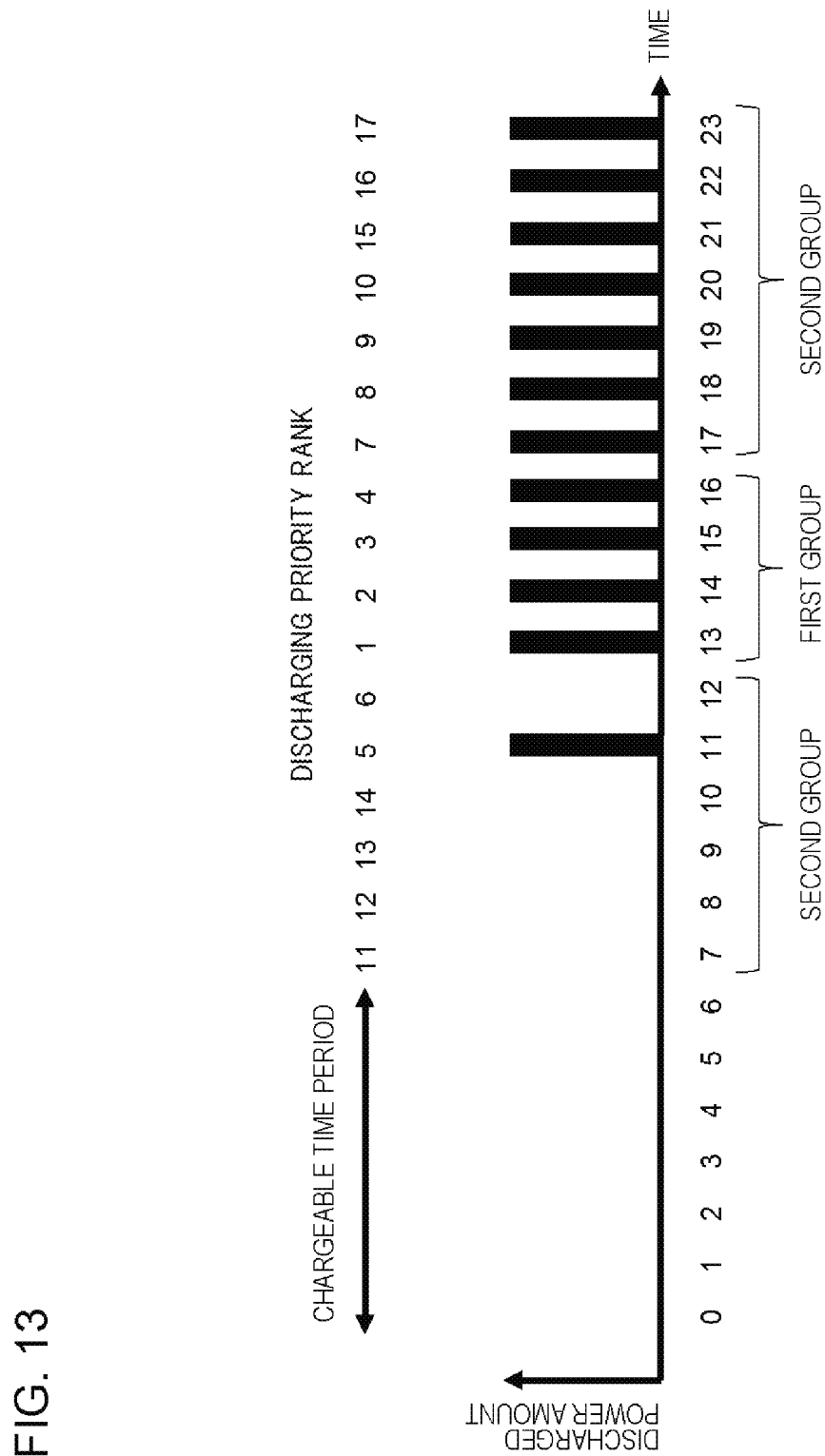
FIG. 13 is a diagram illustrating a configuration of a discharging schedule generation unit according to the present exemplary embodiment.

Here, an example will be described with reference to FIG. 13. In a case of the example illustrated in FIG. 13, an upper limit is a discharging maximum value of a storage battery, or 0. When an upper limit is indicated by the amount of power, the upper limit is set to be a maximum amount of power. On the other hand, when an upper limit is indicated by power, the amount of power discharged when discharging is continuously performed with power having an upper limit for a unit time of a discharging time period is set to be a maximum amount of power. Discharging time periods included between 13 o'clock and 17 o'clock correspond to a first group, and the other discharging time periods correspond to a second group. In addition, discharging priority ranks as shown in the drawing are given to the respective discharging time periods in accordance with power purchasing prices in the respective discharging time periods. The discharging priority ranks illustrated in FIG. 13 are the same as the discharging priority ranks illustrated in FIG. 9.

First, the discharging schedule generation unit 13 determines a discharging maximum value of a storage battery as an upper limit for four discharging time periods included in the first group, in accordance with the discharging priority ranks. Here, a first total is a total of maximum amounts of power defined as described above. In a case of the example illustrated in FIG. 13, the first total is set to a value (the sum of maximum amounts of power between 13 o'clock and 14 o'clock, between 14 o'clock and 15 o'clock, between 15 o'clock and 16 o'clock, and between 16 o'clock and 17 o'clock) which is obtained by multiplying a maximum amount of power by 4.

Thereafter, the discharging schedule generation unit 13 determines an upper limit for discharging time periods included in the second group in accordance with the discharging priority ranks. First, a time period between 11 o'clock and 12 o'clock which has the next highest discharging priority rank is set as an object to be processed. The discharging time period is a discharging time period which is temporally prior to at least one discharging time period included in the first group. A total of maximum amounts of power which are determined on the basis of an upper limit determined for the discharging time period is set to be a second total.

As described above, the discharging schedule generation unit 13 generates a discharging schedule so that the sum of the first total and the second total does not exceed a discharging permission power amount. Consequently, when the discharging schedule generation unit 13 determines a discharging maximum value of a storage battery as an upper limit for a discharging time period between 11 o'clock and 12 o'clock, it is determined whether the sum of the first total and the second total exceeds a discharging permission power amount. When the sum does not exceed the discharging permission power amount, the discharging schedule generation unit 13 determines the discharging maximum value of the storage battery as an upper limit for the discharging time period between 11 o'clock and 12 o'clock. On the other hand, when the sum exceeds the discharging permission power amount, the discharging schedule generation unit 13 determines 0 as an upper limit for the discharging time period between 11 o'clock and 12 o'clock. In a case of the example illustrated in FIG. 13, a discharging maximum value of a storage battery is determined as an upper limit for the discharging time period between 11 o'clock and 12 o'clock.

Thereafter, the discharging schedule generation unit 13 sets a time period between 12 o'clock and 13 o'clock which has the next highest discharging priority rank as an object to be processed. In the same manner as described above, when the discharging schedule generation unit 13 determines a discharging maximum value of a storage battery as an upper limit for the discharging time period between 12 o'clock and 13 o'clock, it is determined whether the sum of the first total and the second total exceeds a discharging permission power amount. In addition, 0 or the discharging maximum value of the storage battery is determined as an upper limit for the time period between 12 o'clock and 13 o'clock in accordance with a result of the determination. In a case of the example illustrated in FIG. 13, 0 is determined as an upper limit for the discharging time period between 12 o'clock and 13 o'clock.

Thereafter, the discharging schedule generation unit 13 sets a time period between 17 o'clock and 18 o'clock which has the next highest discharging priority rank as an object to be processed. The discharging time period is a discharging time period which is temporally after all of the discharging time periods included in the first group. A total of maximum amounts of power which are determined on the basis of an upper limit determined for the discharging time period is set to be a third total.

As described above, the discharging schedule generation unit 13 generates a discharging schedule so that the sum of the first total, the second total, and the third total is set to be equal to or larger than a predetermined amount of power which is determined on the basis of remaining discharge capacity information. For example, the discharging schedule generation unit 13 determines a discharging maximum value of a storage battery as an upper limit for all of the discharging time periods, among the discharging time periods included in the second group, which are temporally after all of the discharging time periods included in the first group.

For example, the discharging schedule generation unit 13 generates the discharging schedule as illustrated in FIG. 13 by continuously performing such a process.

According to the above-described exemplary embodiment, it is possible to realize the same operation and effect as those in the first and second exemplary embodiments.

In addition, according to the present exemplary embodiment, it is possible to generate a discharging schedule so that the sum of a first total and a second total does not exceed a discharging permission power amount. According to the present exemplary embodiment, power of a storage battery is used up before discharging time periods included in the first group, and thus it is possible to suppress the occurrence of an inconvenience in that power cannot be discharged from the storage battery in the discharging time periods.

In addition, according to the present exemplary embodiment, it is possible to generate a discharging schedule so that the sum of a first total, a second total, and a third total is set to be equal to or larger than a discharging permission power amount, preferably, sufficiently exceeds the discharging permission power amount. For example, it is possible to determine a discharging maximum value of a storage battery as an upper limit for all of the discharging time periods which are temporally after all of the discharging time periods included in the first group. According to the present exemplary embodiment, it is possible to use up power corresponding to a discharging permission power amount until a point in time when a discharging process according to a discharging schedule is terminated (for example, a point in time of 24 o'clock in a case of a discharging schedule from 0 o'clock to 24 o'clock).

Fourth Exemplary Embodiment

The present exemplary embodiment is different from the first to third exemplary embodiments in that a discharging schedule is generated by further using predicted demand information indicating predicted power demand of a load 46.

Figure 14:
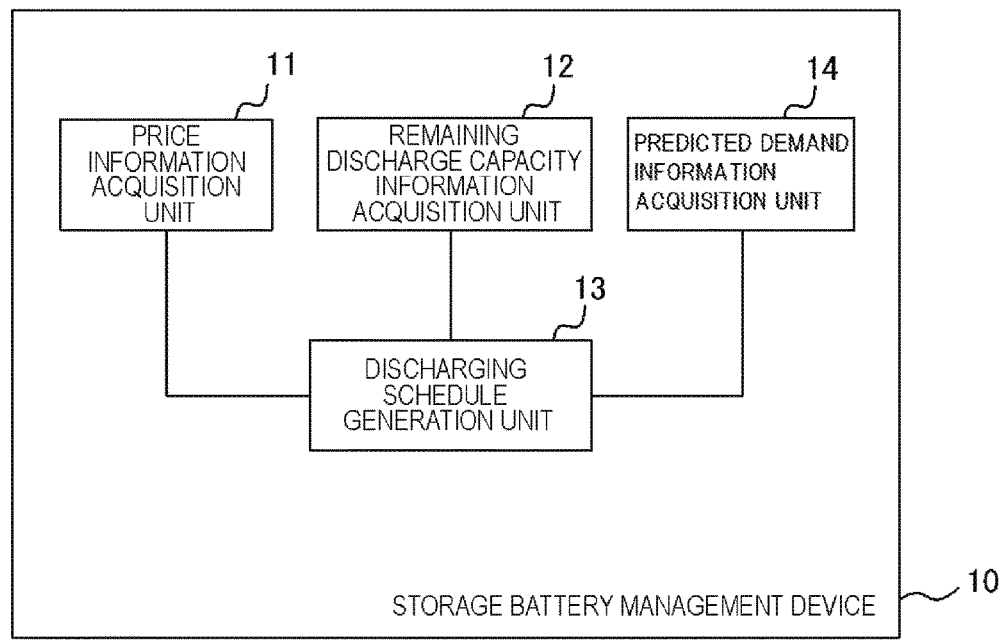
FIG. 14 is a diagram illustrating an example of a functional block diagram of a storage battery management device according to the present exemplary embodiment.

FIG. 14 illustrates an example of a functional block diagram of a storage battery management device 10 according to the present exemplary embodiment. As illustrated in the drawing, the storage battery management device 10 includes a price information acquisition unit 11, a remaining discharge capacity information acquisition unit 12, a discharging schedule generation unit 13, and a predicted demand information acquisition unit 14. Configurations of the price information acquisition unit 11 and the remaining discharge capacity information acquisition unit 12 are the same as those in the first to third exemplary embodiments. Hereinafter, differences from the first to third exemplary embodiments will be described.

The predicted demand information acquisition unit 14 acquires predicted demand information indicating predicted power demand of the load 46. The predicted demand information is information indicating demand for power for each time period. The predicted demand information may be, for example, information which is determined on the basis of the past record. For example, a storage battery system 40 may transmit information indicating record of the amount of power supplied to the load 46 which is connected to a PCS 41, to the storage battery management device 10. The storage battery management device 10 may accumulate the record to thereby generate predicted demand information according to a predetermined algorithm. How the predicted demand information is generated in the present exemplary embodiment is a matter of design.

The discharging schedule generation unit 13 generates a discharging schedule by further using the predicted demand information acquired by the predicted demand information acquisition unit 14. Specifically, the discharging schedule generation unit 13 determines an upper limit for a first discharging time period using predicted demand information in the first discharging time period.

For example, the discharging schedule generation unit 13 can determine a predetermined amount of power equal to or larger than a value of predicted power demand (Wh) in the first discharging time period and can set the value as an upper limit of the amount of power. Alternatively, it is possible to determine an upper limit of power on the basis of the determined predetermined amount of power. Meanwhile, it is preferable to determine such a large value that an error of predicted power demand can be sufficiently absorbed to a certain extent, as the predetermined amount of power instead of determining a value excessively larger than the value of predicted power demand (Wh) as the predetermined amount of power. For example, the discharging schedule generation unit 13 may determine a value obtained by multiplying the predicted power demand (Wh) in the discharging time period by a coefficient which is equal to or larger than 1 and is smaller than 2, or a value obtained by adding a predetermined amount of power which is not excessively large to the predicted power demand (Wh) in the discharging time period, as the predetermined amount of power.

Meanwhile, a case where predicted power demand exceeds a discharging maximum value of a storage battery is also considered. Consequently, the discharging schedule generation unit 13 may set a min (value determined on the basis of predicted power demand, a discharging maximum value) as an upper limit. A smaller value out of a and b is adopted as a min (a, b).

Here, an example will be described with reference to FIG. 15. In (1) of FIG. 15, the magnitude of a power purchasing price in each time period is shown by a bar graph in which the horizontal axis represents a time and the vertical axis represents the power purchasing price. In addition, the magnitude of predicted power demand in each time period is shown by a dotted line in an overlapping manner. In a case of the example shown in the drawing, a time period between M o'clock and M+1 o'clock is set to be one discharging time period.

Figure 15:
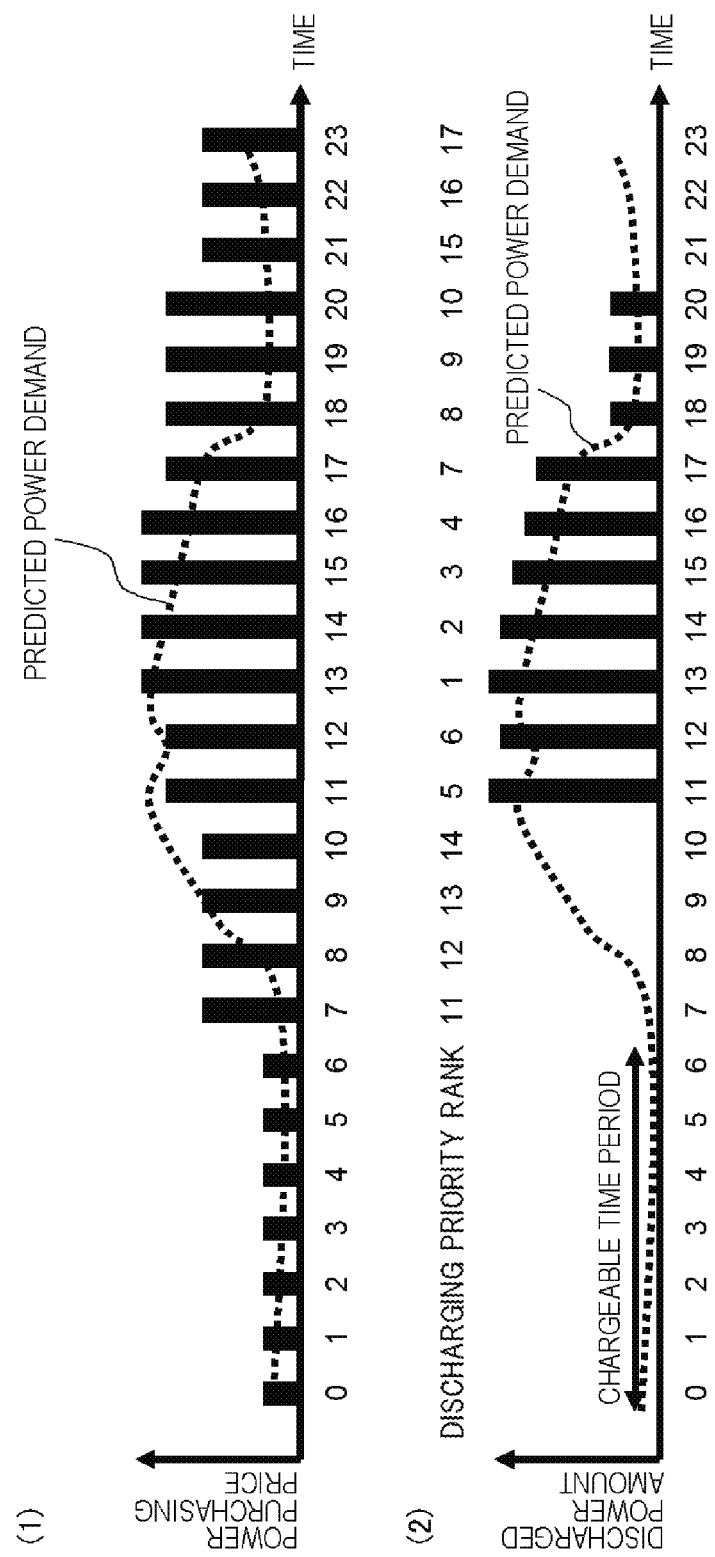
FIG. 15 is a diagram illustrating a configuration of a discharging schedule generation unit according to the present exemplary embodiment.

In (2) of FIG. 15, the horizontal axis represents a time, and the vertical axis represents the amount of power discharged (Wh) indicating an upper limit for permitting discharging from a storage battery. In addition, the magnitude of predicted power demand in each time period is shown by a dotted line in an overlapping manner. Further, discharging priority ranks determined in accordance with power purchasing prices in respective discharging time periods are shown. The discharging priority ranks shown in (2) of FIG. 15 are the same as the discharging priority ranks illustrated in FIG. 9.

The discharging schedule generation unit 13 determines upper limits which are larger than 0 in order from a discharging time period having a high discharging priority rank, and generates a discharging schedule so that a total of maximum amounts of power determined on the basis of upper limits determined for respective discharging time periods does not exceed a discharging permission power amount.

First, the discharging schedule generation unit 13 sets a time period between 13 o'clock and 14 o'clock which is a discharging time period having the highest discharging priority rank, as an object to be processed. The discharging schedule generation unit 13 determines a value equal to or larger than predicted power demand (Wh) of the discharging time period as an upper limit (the amount of power). For example, the discharging schedule generation unit 13 may determine a value obtained by multiplying the predicted power demand (Wh) in the discharging time period by a coefficient which is equal to or larger than 1 and is smaller than 2, or a value obtained by adding a predetermined amount of power which is not excessively large to the predicted power demand (Wh) in the discharging time period, as an upper limit.

Thereafter, the discharging schedule generation unit 13 sets a time period between 14 o'clock and 15 o'clock which is a discharging time period having the next highest discharging priority rank, as an object to be processed. The discharging schedule generation unit 13 determines a value equal to or larger than predicted power demand (Wh) of the discharging time period as an upper limit candidate. For example, the discharging schedule generation unit 13 may determine a value obtained by multiplying the predicted power demand (Wh) in the discharging time period by a coefficient which is equal to or larger than 1, or a value obtained by adding a predetermined amount of power to the predicted power demand (Wh) in the discharging time period, as an upper limit candidate. The discharging schedule generation unit 13 determines whether the sum of the determined upper limit candidate and upper limits determined for the discharging time periods so far does not exceed a discharging permission power amount. When the sum does not exceed the discharging permission power amount, the discharging schedule generation unit 13 determines the upper limit candidate as an upper limit for the discharging time period between the 14 o'clock and 15 o'clock. On the other hand, when the sum exceeds the discharging permission power amount, the discharging schedule generation unit 13 determines 0 as an upper limit for the discharging time period between the 14 o'clock and 15 o'clock. The discharging schedule generation unit 13 determines 0 as an upper limit for all of the discharging time periods having a discharging priority rank lower than that in the discharging time period. Hereinafter, the discharging schedule generation unit 13 similarly determines an upper limit for all discharging time periods, thereby obtaining the discharging schedule as illustrated in (2) of FIG. 15.

In the first and second exemplary embodiments, an example in which an upper limit is determined on the basis of predicted power demand has been described. However, in the third exemplary embodiment, it is also possible to determine an upper limit on the basis of predicted power demand.

According to the present exemplary embodiment, it is possible to realize the same operation and effect as those in the first to third exemplary embodiments.

In addition, according to the present exemplary embodiment, it is possible to generate a discharging schedule in which an upper limit is determined on the basis of predicted power demand, and thus it is not necessary to determine a wastefully large upper limit. In order to suppress the purchase of power from a power supplier in a discharging time period having a high power purchasing price, it is preferable to determine a sufficiently large upper limit for the discharging time period. However, when a wastefully large upper limit is determined, a difference between the amount of power which is actually used in the discharging time period and the upper limit determined for the discharging time period is increased, which results in a deterioration in the accuracy of discharge control. For example, when a discharging schedule is generated so that a total of maximum amounts of power determined on the basis of upper limits determined for respective discharging time periods does not exceed a discharging permission power amount, the number of discharging time periods for which an upper limit larger than 0 can be determined is reduced, and thus the amount of power remaining at a point in time when a discharging process according to the discharging schedule is terminated (for example, a point in time from 24 o'clock in a case of a discharging schedule from 0 o'clock to 24 o'clock) is increased.

According to the present exemplary embodiment, it is possible to determine an upper limit which does not be excessively large and hardly is smaller than the amount of power which is actually used in the discharging time period, on the basis of predicted power demand. As a result, the accuracy of discharge control is improved.

Fifth Exemplary Embodiment

The present exemplary embodiment is different from the first to fourth exemplary embodiments in that a discharging schedule is generated by further using predicted power generation information indicating a predicted power generation amount for each time period of a power generation device 47.

Figure 16:
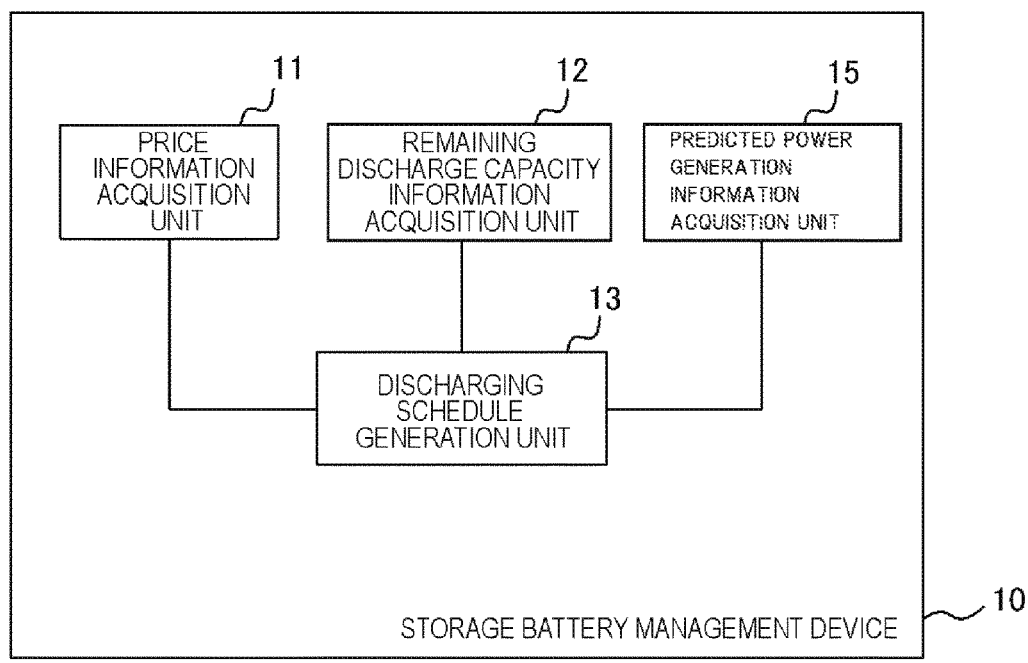
FIG. 16 is a diagram illustrating an example of a functional block diagram of a storage battery management device according to the present exemplary embodiment.

FIG. 16 illustrates an example of a functional block diagram of a storage battery management device 10 according to the present exemplary embodiment. As illustrated in the drawing, the storage battery management device 10 includes a price information acquisition unit 11, a remaining discharge capacity information acquisition unit 12, a discharging schedule generation unit 13, and a predicted power generation information acquisition unit 15. Meanwhile, although not shown in the drawing, the storage battery management device may further include a predicted demand information acquisition unit 14. Configurations of the price information acquisition unit 11, the remaining discharge capacity information acquisition unit 12, and the predicted demand information acquisition unit 14 are the same as those in the first to fourth exemplary embodiments. Hereinafter, differences from the first to fourth exemplary embodiments will be described.

The predicted power generation information acquisition unit 15 acquires predicted power generation information indicating a predicted power generation amount for each time period of a power generation device 47 that is a power supply source different from an electric power system 45, and that supplies power to a load 46 or a storage battery (battery pack 44) included in a storage battery system 40.

In the present exemplary embodiment, a unit of generating a predicted power generation amount is a matter of design. In a case of the power generation device 47 that generates power using natural energy, a predicted power generation amount may be generated using information such as a weather forecast.

The discharging schedule generation unit 13 generates a discharging schedule by further using predicted power generation information.

Here, an example will be described with reference to FIG. 17. In (1) of FIG. 17, the magnitude of a power purchasing price in each time period is shown by a bar graph in which the horizontal axis represents a time and the vertical axis represents the power purchasing price. In addition, the magnitude of a predicted power generation amount in each time period is shown by a line in an overlapping manner. In a case of the example shown in the drawing, a time period between M o'clock and M+1 o'clock is set to be one discharging time period.

Figure 17:
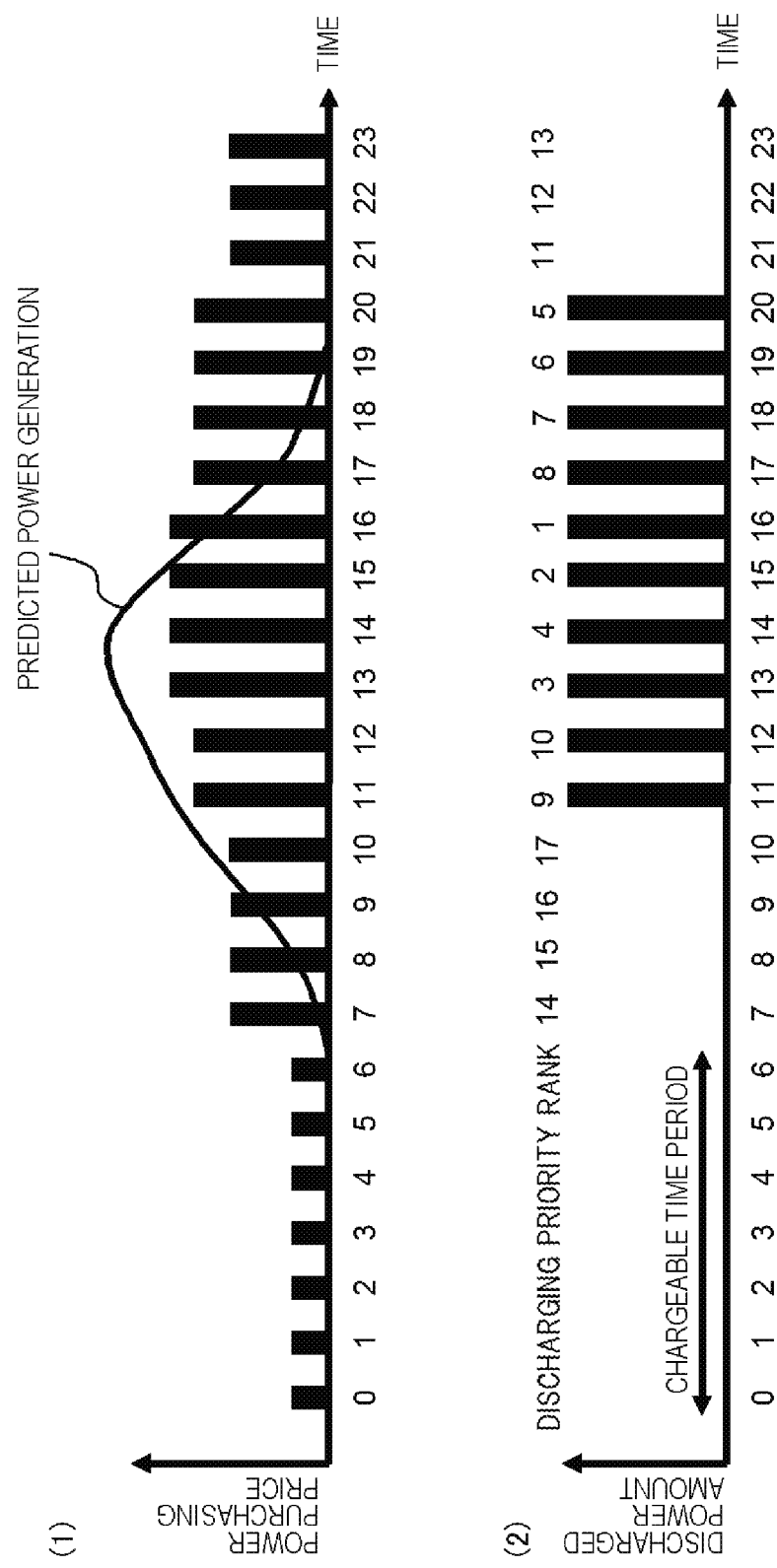
FIG. 17 is a diagram illustrating a configuration of a discharging schedule generation unit according to the present exemplary embodiment.

In (2) of FIG. 17, the horizontal axis represents a time, and the vertical axis represents the amount of power discharged (Wh) indicating an upper limit for permitting discharging from a storage battery. Further, discharging priority ranks of respective discharging time periods are shown. The discharging priority ranks are determined in accordance with the following rule.

Higher discharging priority ranks are given in order of a discharging time period having a high power purchasing price.

Higher discharging priority ranks are given to discharging time periods having the same power purchasing price in order of a discharging time period with a small predicted power generation amount.

Higher discharging priority ranks are given to discharging time periods having the same power purchasing price and the same predicted power generation amount in order from an early discharging time period.

The discharging schedule generation unit 13 can generate a discharging schedule as illustrated in (2) of FIG. 17 by generating a discharging schedule so that a total of maximum amounts of power determined on the basis of upper limits determined for respective discharging time periods does not exceed a discharging permission power amount, in accordance with the discharging priority ranks determined in this manner. Meanwhile, an upper limit in (2) of FIG. 17 is a discharging maximum value, but other values described in the above-described exemplary embodiment can also be set as upper limits. Alternatively, the discharging schedule generation unit 13 may set a min (discharging maximum value, max (0, predicted power demand-predicted power generation amount)+a) as an upper limit. A larger value out of a and b is adopted as a max (a, b).

In addition, here, a description has been given of an example in which a discharging schedule is generated so that a total of maximum amounts of power determined on the basis of upper limits determined for respective discharging time periods does not exceed a discharging permission power amount, after discharging priority ranks are determined. However, it is also possible to generate a discharging schedule using the method described in the third exemplary embodiment after discharging priority ranks are determined.

Here, another example will be described with reference to FIG. 18. In (1) of FIG. 18, the magnitude of a power purchasing price in each time period is shown by a bar graph in which the horizontal axis represents a time and the vertical axis represents the power purchasing price. In addition, the magnitude of a predicted power generation amount in each time period is shown by a line in an overlapping manner. Further, a price of power (a selling price of power), generated by the power generation device 47, which is sold to a power supplier is shown by a line. For example, the price information acquisition unit 11 may acquire power selling price information indicating a selling price of power generated by the power generation device 47. In a case of the example shown in the drawing, a time period between M o'clock and M+1 o'clock is set to be one discharging time period. In a case of the example shown in (1) of FIG. 18, a selling price of power is constant irrespective of a time period, but may have a value which is different for each time period (the same is true of all of the exemplary embodiments).

The discharging schedule generation unit 13 generates a discharging schedule in accordance with the following premise.

In a time period having a selling price of power equal to or lower than a power purchasing price, power generated by the power generation device 47 is supplied to the load 46 or the storage battery.

In a time period having a selling price of power higher than a power purchasing price, power generated by the power generation device 47 is not supplied to the load 46 and the storage battery.

When a selling price of power is equal to or lower than a power purchasing price, it is advantageous to supply power generated by the power generation device 47 to the load 46 or the storage battery without selling the power. On the other hand, when a selling price of power is higher than a power purchasing price, it is advantageous to sell power generated by the power generation device 47 without supplying the power to the load 46 or the storage battery. The above-mentioned premise is based on such a fact.

Meanwhile, the premise that "power generated by the power generation device 47 is not supplied to the load 46 and the storage battery in a time period having a selling price of power higher than a power purchasing price" is a premise assumed in order to merely create a discharging schedule (in order to determine an upper limit for each discharging time period), and power does not necessarily have to be operated as premised. That is, when the storage battery system 40 discharges power in accordance with the discharging schedule created on the basis of the premise, power generated by the power generation device 47 may be supplied to the load 46 and the storage battery in a time period having a selling price of power higher than a power purchasing price.

Figure 18:
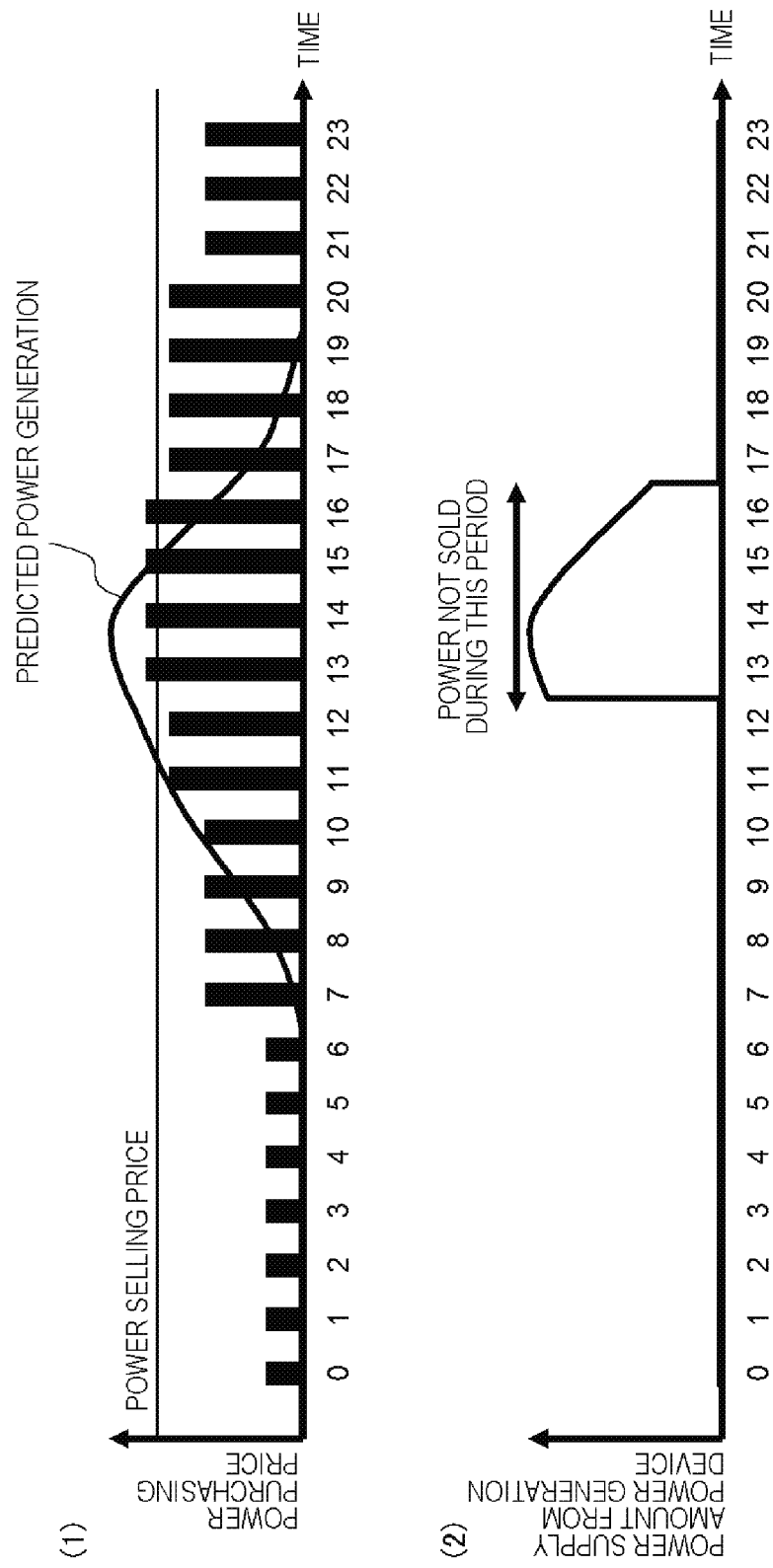
FIG. 18 is a diagram illustrating a configuration of a discharging schedule generation unit according to the present exemplary embodiment.

In (2) of FIG. 18, a predicted power generation amount in a time period having a selling price of power equal to or lower than a power purchasing price is shown. That is, a predicted power amount (hereinafter, "predicted power supply amount") which is supplied to the load 46 or the storage battery from the power generation device 47 is shown.

For example, the discharging schedule generation unit 13 may similarly give discharging priority ranks using a predicted power supply amount instead of a predicted power generation amount in the method described with reference to FIG. 17 to thereby generate a discharging schedule.

Here, another example will be described with reference to FIG. 19. In (1) of FIG. 19, the magnitude of a power purchasing price in each time period is shown by a bar graph in which the horizontal axis represents a time and the vertical axis represents the power purchasing price. In addition, the magnitude of predicted power demand in each time period is shown by a dotted line in an overlapping manner. Further, the magnitude of a predicted power supply in each time period is shown by a line in an overlapping manner. In a case of the example shown in the drawing, a time period between M o'clock and M+1 o'clock is set to be one discharging time period.

Figure 19:
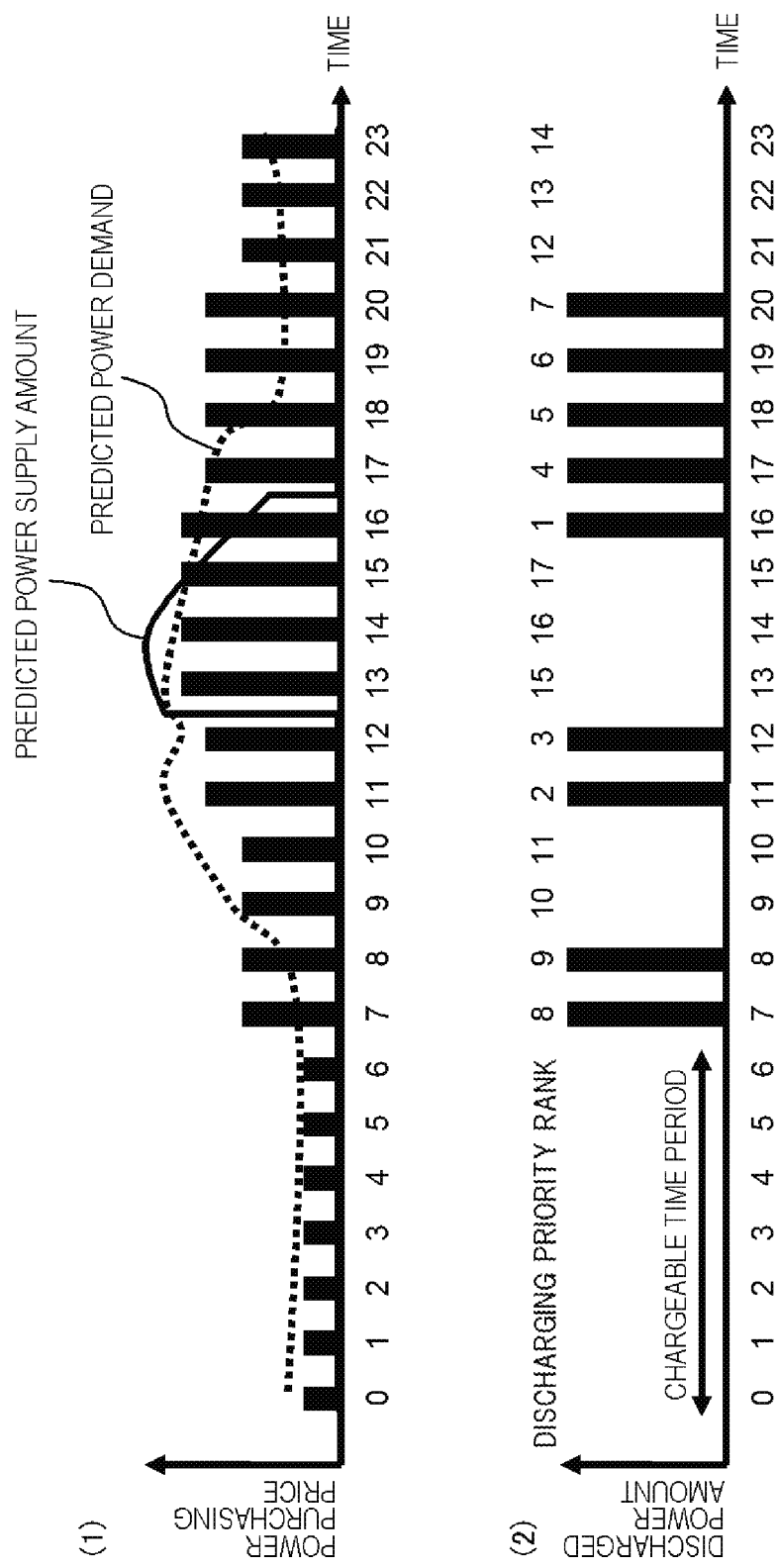
FIG. 19 is a diagram illustrating a configuration of a discharging schedule generation unit according to the present exemplary embodiment.

In (2) of FIG. 19, the horizontal axis represents a time, and the vertical axis represents the amount of power discharged (Wh) indicating an upper limit for permitting discharging from a storage battery. Further, discharging priority ranks of respective discharging time periods are shown. The discharging priority ranks are determined in accordance with the following rules.

High discharging priority ranks are given in order from a discharging time period having a predicted power supply amount equal to or less than predicted power demand.

When there are a plurality of discharging time periods having a predicted power supply amount equal to or less than predicted power demand, discharging priority ranks are given in order from a discharging time period having a high power purchasing price.

High discharging priority ranks are given to discharging time periods having the same power purchasing price in order from an early discharging time period.

The discharging schedule generation unit 13 can generate a discharging schedule as illustrated in (2) of FIG. 19 by generating a discharging schedule so that a total of upper limits determined for respective discharging time periods does not exceed a discharging permission power amount, in accordance with the discharging priority ranks determined in this manner. Meanwhile, an upper limit in (2) of FIG. 19 is a discharging maximum value, but other values having been described so far can also be set as upper limits.

In addition, here, a description has been given of an example in which a discharging schedule is generated so that a total of maximum amounts of power determined on the basis of upper limits determined for respective discharging time periods does not exceed a discharging permission power amount after discharging priority ranks are determined. However, it is also possible to generate a discharging schedule using the method described in the third exemplary embodiment after discharging priority ranks are determined.

In addition, the discharging schedule generation unit 13 can similarly give discharging priority ranks using a predicted power generation amount instead of a predicted power supply amount in the method described with reference to FIG. 19 to thereby generate a discharging schedule.

In this manner, the discharging schedule generation unit 13 may generate a discharging schedule by giving higher priority to the supply of power to the load 46 from the power generation device 47 over the supply of power to the load 46 from the storage battery in a discharging time period in which power can be supplied to the load 46 or the storage battery from the power generation device 47. The storage battery system 40 discharges power by giving priority to the supply of power to the load 46 from the power generation device 47 over the supply of power to the load 46 from the storage battery in a discharging time period in which power can be supplied to the load 46 or the storage battery from the power generation device 47.

According to the present exemplary embodiment, it is possible to realize the same operation and effect as those in the first to fourth exemplary embodiments.

In addition, according to the present exemplary embodiment, a discharging schedule can be generated on the basis of a predicted power generation amount of the power generation device 47, and thus it is possible to generate an appropriate discharging schedule in consideration of the amount of power generation of the power generation device 47.

In addition, according to the present exemplary embodiment, division into a time period in which power generated by the power generation device 47 is sold and a time period in which power is supplied to the storage battery or the load 46 is performed on the basis of a magnitude relationship between a power purchasing price and a selling price of power, and thus it is possible to generate a discharging schedule in which power generated by the power generation device 47 is preferentially used in a discharging time period included in a time period determined to supply power to the storage battery or the load 46. As a result, it is possible to effectively use power generated by the power generation device 47.

Sixth Exemplary Embodiment

An example of a functional block diagram of a storage battery management device 10 according to the present exemplary embodiment is illustrated in FIG. 16, similar to the fifth exemplary embodiment. Configurations of a price information acquisition unit 11, a remaining discharge capacity information acquisition unit 12, a predicted demand information acquisition unit 14, and a predicted power generation information acquisition unit 15 are the same as those in the first to fifth exemplary embodiments. Hereinafter, differences from the first to fifth exemplary embodiments will be described.

The discharging schedule generation unit 13 calculates time-series changes of the amount of power, that can be supplied to a load 46 from a storage battery, which is based on changes in the amount of charge of the storage battery due to the supply of power to the storage battery from a power generation device 47, using remaining discharge capacity information and predicted power generation information. The discharging schedule generation unit 13 generates a discharging schedule in consideration of the changes.

Here, an example will be described with reference to FIG. 20. In (1) of FIG. 20, the horizontal axis represents a time, and the vertical axis represents surplus generation power. The surplus generation power is the amount of power generation remaining when predicted power demand specified by predicted demand information is subtracted from a predicted power generation specified by predicted power generation information. When the predicted power demand is larger than the predicted power generation, the surplus generation power is set to 0. Meanwhile, the surplus generation power may be the amount of power generation remaining when predicted power demand specified by predicted demand information is subtracted from the predicted power supply amount described in the fifth exemplary embodiment.

The discharging schedule generation unit 13 calculates changes in the amount of charge of the storage battery on the premise that the storage battery is charged with the surplus generation power calculated as described above.

Figure 20:
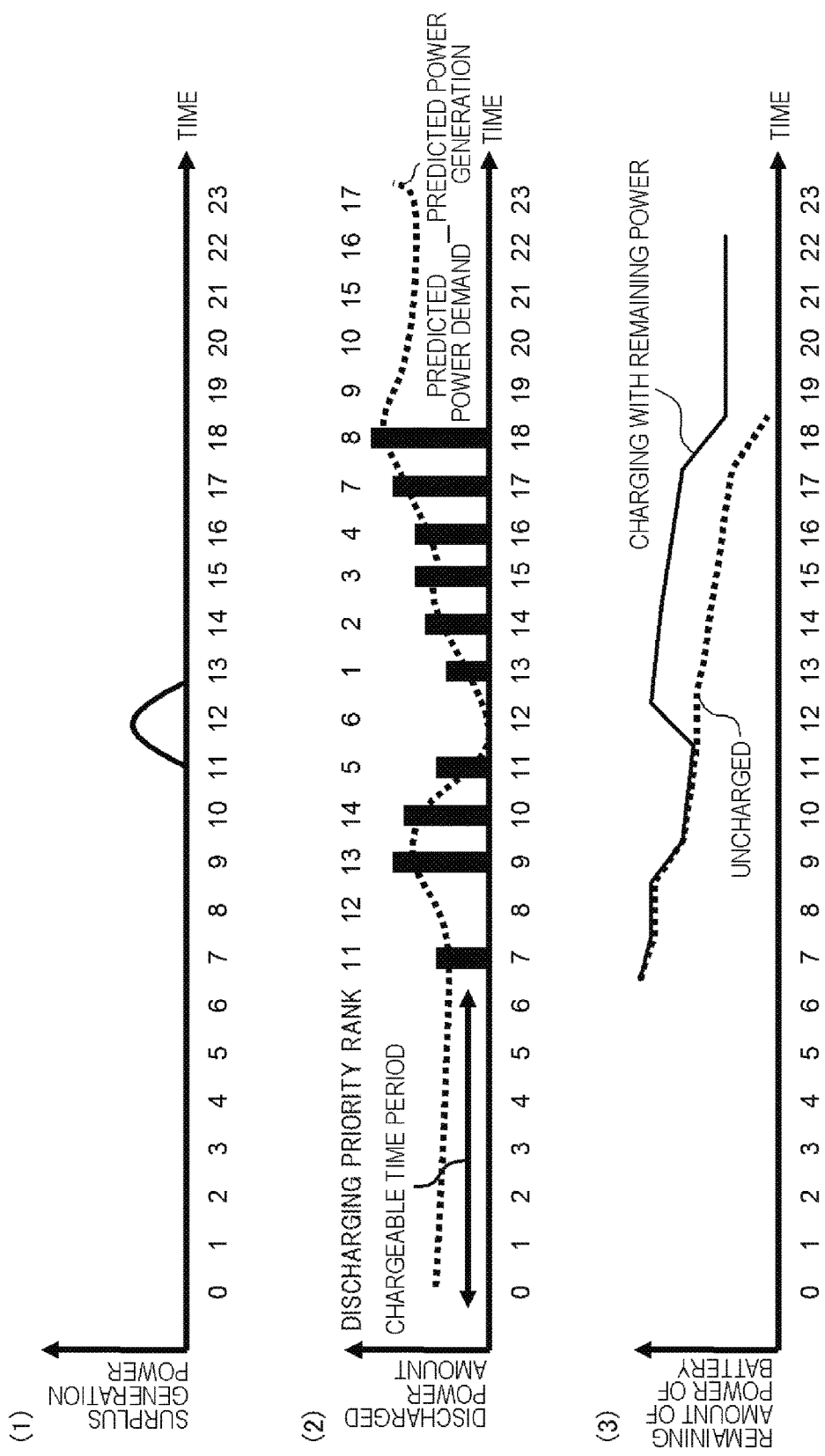
FIG. 20 is a diagram illustrating a configuration of a discharging schedule generation unit according to the present exemplary embodiment.

In (2) of FIG. 20, the horizontal axis represents a time, and the vertical axis represents the amount of power discharged (Wh) indicating an upper limit for permitting discharging from a storage battery. In addition, the magnitude of a value obtained by subtracting a predicted power generation amount from predicted power demand in each time period is shown by a dotted line in an overlapping manner. Further, discharging priority ranks determined in accordance with power purchasing prices in respective discharging time periods are shown. The discharging priority ranks shown in (2) of FIG. 20 are the same as the discharging priority ranks illustrated in FIG. 9. In a case of the example shown in the drawing, a time period between M o'clock and M+1 o'clock is set to be one discharging time period.

An upper limit of the amount of power discharged is set so that a total of upper limits in order from a discharging time period having a high discharging priority rank does not exceed a discharging permission power amount. An upper limit which is larger than 0 is determined on the basis of predicted power demand of the load 46 (see the fourth exemplary embodiment).

In (3) of FIG. 20, the horizontal axis represents a time, and the vertical axis represents the amount of charge (Wh) of a storage battery. In addition, a dotted line indicates changes in the amount of charge of the storage battery in a case where power is discharged up to an upper limit in each discharging time period, as in a discharging schedule of (2) of FIG. 20. In addition, a line indicates changes in the amount of charge of the storage battery in a case where power is discharged up to an upper limit in each discharging time period and a case where the storage battery is charged with the surplus generation power shown in (1) of FIG. 20 at the timing, as in the discharging schedule of (2) of FIG. 20.

The discharging schedule generation unit 13 calculates time-series changes in the amount of power (discharging permission power amount) that can be supplied to the load 46 from the storage battery on the basis of changes in the amount of charge of the storage battery, thereby generating a discharging schedule in consideration of the changes. For example, in a discharging time period after a time when charging of surplus generation power is performed, a discharging schedule is generated by setting the amount of added surplus generation power as dischargeable power. When surplus generation power is generated, the storage battery system 40 charges the storage battery with the generated surplus generation power. Specifically, as a result of increasing a discharging permission power amount by performing charging of surplus power shown in (3) of FIG. 20, it may be able to determine the amount of power discharged which is larger than 0 for time periods (ninth and tenth in discharging priority rank) between 19 o'clock and 20 o'clock and between 20 o'clock and 21 o'clock shown in (2) of FIG. 20. Further, when the determined amount of power discharged does not exceed the discharging permission power amount, it is possible to determine the amount of power discharged which is larger than 0 for a time period (twelfth in discharging priority rank) between 8 o'clock and 9 o'clock shown in (2) of FIG. 20.

According to the present exemplary embodiment, it is possible to realize the same operation and effect as those in the first to fifth exemplary embodiments.

In addition, according to the present exemplary embodiment, a discharging schedule can be generated on the basis of a premise that the storage battery is charged with surplus generation power which has not been sold and has not been supplied to the load 46 in power generated by the power generation device 47, and thus it is possible to generate an appropriate discharging schedule in consideration of the amount of power generation of the power generation device 47 and predicted demand of the load 46.

In addition, according to the present exemplary embodiment, it is possible to generate a discharging schedule so as to use up, for example, surplus generation power by the surplus generation power being set as dischargeable power. As a result, it is possible to effectively use power generated by the power generation device 47.

Seventh Exemplary Embodiment

An example of a functional block diagram of a storage battery management device 10 according to the present exemplary embodiment is illustrated in FIGS. 5, 14 and 16, similar to the first to sixth exemplary embodiments. Configurations of a price information acquisition unit 11, a predicted demand information acquisition unit 14, and a predicted power generation information acquisition unit 15 are the same as those in the first to sixth exemplary embodiments. Hereinafter, differences from the first to sixth exemplary embodiments will be described.

A remaining discharge capacity information acquisition unit 12 acquires updated remaining discharge capacity information indicating the amount of power, that can be supplied to a load 46 from a storage battery at a predetermined timing, at the timing.

The remaining discharge capacity information acquisition unit 12 acquires updated remaining discharge capacity information from a storage battery system 40 at a predetermined timing during a discharging process being performed by the storage battery system 40, in accordance with a discharging schedule. The predetermined timing may be a predetermined time, such as 10 o'clock, 12 o'clock, or 15 o'clock, which is set in advance. Alternatively, the predetermined timing may be a timing immediately after a single discharging time period is terminated. Alternatively, the predetermined timing may be a timing when generated power is supplied to a storage battery from a power generation device 47.

The discharging schedule generation unit 13 updates a discharging schedule after the predetermined timing, using the updated remaining discharge capacity information. Specifically, the discharging schedule generation unit 13 newly regenerates a discharging schedule using the updated remaining discharge capacity information instead of remaining discharge capacity information in the method of generating a discharging schedule which is described in the above-described exemplary embodiment.

According to the present exemplary embodiment, it is possible to realize the same operation and effect as those in the first to sixth exemplary embodiments.

In addition, according to the present exemplary embodiment, at any timing in the middle of a discharging process performed in accordance with a discharging schedule, it is possible to ascertain an actual amount of power that can be supplied to the load 46 from the storage battery at the point in time and to generate a discharging schedule on the basis of the ascertained value.

The discharging schedule is a schedule in which an upper limit of discharging from the storage battery is set, and an actual amount of discharge according to the schedule is set to be equal to or less than the upper limit. When the amount of power supplied to the load 46 is smaller than the upper limit which is set in the discharging schedule, power is not discharged up to a maximum amount of power which is determined on the basis of the upper limit in the discharging time period. In addition, the amount of charge of the storage battery changes by surplus generation power being charged in the storage battery. Further, when the power generation device 47 is a device that generates power using natural energy, it is difficult to accurately predict the amount of power generation, and the amount of power generation may deviate greatly.

When a discharging process is performed according to an initially created discharging schedule due to, for example, these factors, an inconvenience may occur in that power of the storage battery remains at a point in time when a discharging process according to the discharging schedule is terminated (for example, a point in time of 24 o'clock in a case of a discharging schedule from 0 o'clock to 24 o'clock). In addition, when the amount of power generation of the power generation device 47 is smaller than predicted, the power of the storage battery run short earlier than predicted, which may result in an inconvenience in that power cannot be discharged from the storage battery in a discharging time period having a relatively high power purchasing price.

According to the present exemplary embodiment, at any timing in the middle of a discharging process performed in accordance with a discharging schedule, it is possible to ascertain an actual amount of power that can be supplied to the load 46 from the storage battery at the point in time and to generate a discharging schedule on the basis of the ascertained value, and thus it is possible to reduce the occurrence of the above-mentioned inconvenience.

Eighth Exemplary Embodiment

An example of a functional block diagram of a storage battery management device 10 according to the present exemplary embodiment is illustrated in FIGS. 5, 14, and 16, similar to the first to seventh exemplary embodiments. Configurations of a remaining discharge capacity information acquisition unit 12, a predicted demand information acquisition unit 14, and a predicted power generation information acquisition unit 15 are the same as those in the first to seventh exemplary embodiments. Hereinafter, differences from the first to seventh exemplary embodiments will be described.

A price information acquisition unit 11 further acquires privilege information indicating a privilege for each time period according to the amount of power supplied from the electric power system 45. For example, the privilege information may be information indicating that a predetermined privilege is obtained when the amount of power supplied from an electric power system 45 in a first time period is smaller than a predetermined value.

A discharging schedule generation unit 13 generates a discharging schedule by further using privilege information. For example, the discharging schedule generation unit 13 may allocate an upper limit which is larger than those for other discharging time periods to discharging time periods included in the first time period. Alternatively, the discharging schedule generation unit 13 may give a discharging priority rank which is higher than those of other discharging time periods to discharging time periods included in the first time period to thereby generate a discharging schedule.

Figure 21:
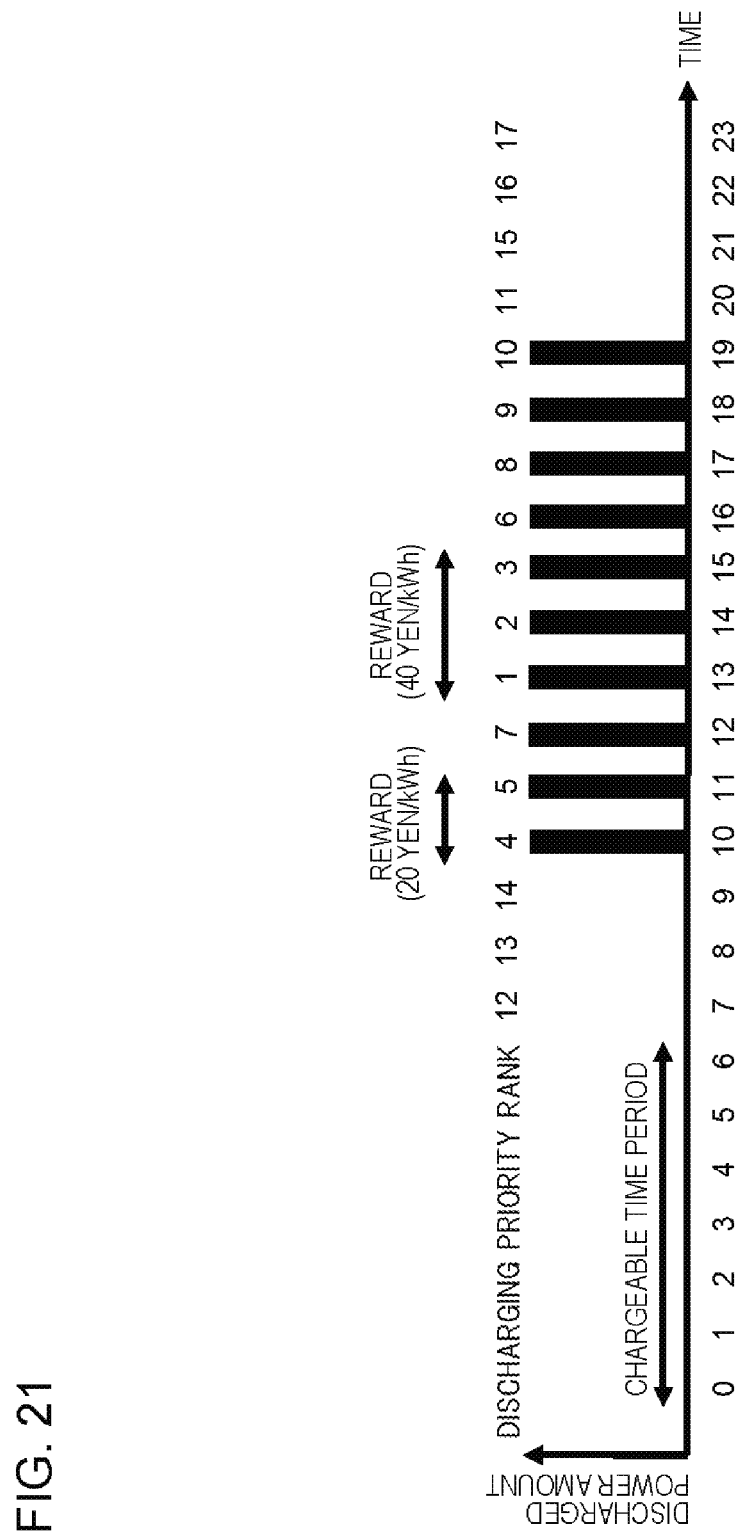
FIG. 21 is a diagram illustrating a configuration of a discharging schedule generation unit according to the present exemplary embodiment.

Here, an example will be described with reference to FIG. 21. In FIG. 21, the horizontal axis represents a time, and the vertical axis represents the amount of power discharged (Wh) indicating an upper limit for permitting discharging from a storage battery. In addition, time periods in which a predetermined privilege (reward) is obtained when the amount of power supplied from the electric power system 45 is smaller than a predetermined value are shown in an overlapping manner. The privilege means that when the amount of power supplied from the electric power system 45 is smaller than a predetermined value, money according to a magnitude of the difference can be received.

In addition, discharging priority ranks of respective discharging time periods are shown in FIG. 21. The discharging priority ranks are determined in accordance with the following rule.

Higher discharging priority ranks are given in order of a discharging time period having a privilege.
When there are a plurality of discharging time periods having a privilege, higher discharging priority ranks are given in order of a discharging time period having a large privilege.

When there are a plurality of discharging time periods having the same privilege level, higher discharging priority ranks are given in order of a discharging time period having a high power purchasing price.

When there are a plurality of discharging time periods having no privilege, high discharging priority ranks are given in order from a discharging time period having a high power purchasing price.

High discharging priority ranks are given to discharging time periods having the same power purchasing price in order from an early discharging time period.

The discharging schedule generation unit 13 can generate a discharging schedule as illustrated in FIG. 21 by generating a discharging schedule so that a total of upper limits determined for respective discharging time periods does not exceed a discharging permission power amount, in accordance with the discharging priority ranks determined in this manner. Meanwhile, an upper limit in FIG. 21 is a discharging maximum value, but other values described in the above-described exemplary embodiment can also be set as upper limits.

In addition, here, a description has been given of an example in which a discharging schedule is generated so that a total of upper limits determined for respective discharging time periods does not exceed a discharging permission power amount, after discharging priority ranks are determined. However, it is also possible to generate a discharging schedule using the method described in the third exemplary embodiment after discharging priority ranks are determined.

According to the present exemplary embodiment, it is possible to realize the same operation and effect as those in the first to seventh exemplary embodiments.

In addition, according to the present exemplary embodiment, it is possible to generate a discharging schedule so that a privilege for each time period according to the amount of power supplied from the electric power system 45 is received, in consideration of the privilege.

Hereinafter, an example of a reference configuration will be appended.

1. A storage battery management device, wherein the storage battery management device determines an upper limit of power discharged from a storage battery or an upper limit of an amount of power discharged from the storage battery for each of discharging time periods divided for each unit time, on the basis of remaining discharge capacity information indicating an amount of power that can be supplied to a load from the storage battery.

2. The storage battery management device according to 1, wherein the upper limit is determined on the basis of information regarding power to be supplied to the storage battery and the remaining discharge capacity information.

3. The storage battery management device according to 2, wherein the information regarding power is power purchasing price information indicating a power purchasing price for each time period.

4. The storage battery management device according to 3, wherein the upper limit is determined so that an upper limit in the discharging time period having a relatively high power purchasing price is larger than an upper limit in the discharging time period having a relatively low power purchasing price.

5. The storage battery management device according to 3 or 4, wherein priority ranks are given to the discharging time periods so that a priority rank of the discharging time period having a high power purchasing price is high, and the upper limit is determined so that an upper limit for a first discharging time period is set to be equal to or larger than an upper limit for a second discharging time period having a priority rank lower than that of the first discharging time period.

6. The storage battery management device according to any one of 3 to 5, wherein a plurality of the discharging time periods are divided into a first group in which discharging time periods having a relatively high power purchasing price are collected and a second group in which discharging time periods having a relatively low power purchasing price are collected, wherein a maximum amount of power that can be discharged in each discharging time period is specified on the basis of the upper limit of the power or the upper limit of the amount of power, and wherein a discharging schedule is generated so that a sum of a first total which is a total of maximum amounts of power in the respective discharging time periods included in the first group and a second total which is a total of maximum amounts of power in the respective discharging time periods, included in the second group, which are temporally prior to at least one discharging time period included in the first group does not exceed a predetermined amount of power which is determined on the basis of the remaining discharge capacity information.

7. The storage battery management device according to 6, wherein the discharging schedule is generated so that a sum of a third total which is a total of maximum amounts of power in the respective discharging time periods, included in the second group, which are temporally after all of the discharging time periods included in the first group, the first total, and the second total is set to be equal to or larger than the predetermined amount of power which is determined on the basis of the remaining discharge capacity information.

8. The storage battery management device according to any one of 3 to 7, wherein any one of maximum power that can be discharged from the storage battery and a predetermined value smaller than the maximum power is determined as the upper limit for each of the discharging time periods.

9. The storage battery management device according to any one of 3 to 7, wherein any one of a maximum amount of power that can be discharged from the storage battery per unit time and a predetermined value smaller than the maximum amount of power is determined as the upper limit for each of the discharging time periods.

10. The storage battery management device according to any one of 3 to 9, wherein the upper limit is determined by further using predicted demand information indicating predicted power demand of the load.

11. The storage battery management device according to 10, wherein a value equal to or larger than a value of the predicted power demand in the discharging time period is determined as the upper limit.

12. The storage battery management device according to any one of 3 to 11, wherein the upper limit is determined by further using predicted power generation information indicating a predicted power generation amount for each time period of a power generation device that supplies power to the load or the storage battery.

13. The storage battery management device according to 12,
wherein the upper limit is determined by further using power selling price information indicating a selling price of power which is generated by the power generation device.

14. The storage battery management device according to 13,
wherein the upper limit is determined on a premise that the power generated by the power generation device is supplied to the load or the storage battery in a time period having a selling price of power equal to or lower than the power purchasing price and the power generated by the power generation device is not supplied to the load or the storage battery in a time period having a selling price of power higher than the power purchasing price.

15. The storage battery management device according to any one of 1 to 13,
wherein updated remaining discharge capacity information indicating an amount of power that can be supplied to the load from the storage battery at a predetermined timing is acquired at the timing, and the upper limit for the discharging time period after the predetermined timing is updated by further using the updated remaining discharge capacity information.

16. The storage battery management device according to any one of 1 to 15,
wherein the upper limit is determined by further using privilege information indicating a privilege for each time period according to an amount of power supplied from an electric power system.

17. The storage battery management device according to 16,
wherein the privilege information is information indicating that a predetermined privilege is obtained when the amount of power supplied from the electric power system in a first time period is smaller than a predetermined value, and
wherein the upper limit which is larger than upper limits for the other discharging time periods is determined for the discharging time period included in the first time period.

18. The storage battery management device according to any one of 1 to 17,
wherein a maximum amount of power that can be discharged in each discharging time period which is specified on the basis of the upper limit of the power or the upper limit of the amount of power which is obtained by subtracting a predetermined amount from an amount of power that can be supplied to the load from the storage battery.

19. The storage battery management device according to any one of 1 to 18,
wherein a chargeable time period in which the storage battery acquires power from the electric power system and charges the power is determined, and a time period except for the chargeable time period is determined as the discharging time period.

20. A storage battery that discharges power in accordance with the upper limit determined by the storage battery management device according to any one of 1 to 19.

21. A method of managing a storage battery, the method including:
causing a computer to determine an upper limit of power discharged from the storage battery or an upper limit of an amount of power discharged from the storage battery for each of discharging time periods divided for each unit time, on the basis of remaining discharge capacity information indicating an amount of power that can be supplied to a load from the storage battery.

21-2. The method according to 21,
wherein the computer determines the upper limit on the basis of information regarding power to be supplied to the storage battery and the remaining discharge capacity information.

21-3. The method according to 21 or 21-2,
wherein the information regarding power is power purchasing price information indicating a power purchasing price for each time period.

21-4. The method according to 21-3,
wherein the computer determines the upper limit so that an upper limit in the discharging time period having a relatively high power purchasing price is larger than an upper limit in the discharging time period having a relatively low power purchasing price.

21-5. The method according to 21-3 or 21-4,
wherein the computer gives priority ranks to the discharging time periods so that a priority rank of the discharging time period having a high power purchasing price is high, and determines the upper limit so that an upper limit for a first discharging time period is set to be equal to or larger than an upper limit for a second discharging time period having a priority rank lower than that of the first discharging time period.

21-6. The method according to any one of 21-3 to 21-5,
wherein the computer
divides a plurality of the discharging time periods into a first group in which discharging time periods having a relatively high power purchasing price are collected and a second group in which discharging time periods having a relatively low power purchasing price are collected,
specifies a maximum amount of power that can be discharged in each discharging time period on the basis of the upper limit of the power or the upper limit of the amount of power, and
generates a discharging schedule so that a sum of a first total which is a total of maximum amounts of power in the respective discharging time periods included in the first group and a second total which is a total of maximum amounts of power in the respective discharging time periods, included in the second group, which are temporally prior to at least one discharging time period included in the first group does not exceed a predetermined amount of power which is determined on the basis of the remaining discharge capacity information.

21-7. The method according to 21-6,
wherein the computer generates the discharging schedule so that a sum of a third total which is a total of maximum amounts of power in the respective discharging time periods, included in the second group, which are temporally after all of the discharging time periods included in the first group, the first total, and the second total is set to be equal to or larger than the predetermined amount of power which is determined on the basis of the remaining discharge capacity information.

21-8. The method according to any one of 21-3 to 21-7,
wherein the computer determines any one of maximum power that can be discharged from the storage battery and a predetermined value smaller than the maximum power, as the upper limit for each of the discharging time periods.

21-9. The method according to any one of 21-3 to 21-7,
wherein the computer determines any one of a maximum amount of power that can be discharged from the storage battery per unit time and a predetermined value smaller than the maximum amount of power, as the upper limit for each of the discharging time periods.

21-10. The method according to any one of 21-3 to 21-9,
wherein the computer determines the upper limit by further using predicted demand information indicating a predicted power demand of the load.

21-11. The method according to 21-10,
wherein the computer determines a value equal to or larger than a value of the predicted power demand in the discharging time period, as the upper limit.

21-12. The method according to any one of 21-3 to 21-11,
wherein the computer determines the upper limit by further using predicted power generation information indicating a predicted power generation amount for each time period of a power generation device that supplies power to the load or the storage battery.

21-13. The method according to 21-12,
wherein the computer determines the upper limit by further using power selling price information indicating a selling price of power which is generated by the power generation device.

21-14. The method according to 21-13,
wherein the computer determines the upper limit on a premise that the power generated by the power generation device is supplied to the load or the storage battery in a time period having a selling price of power equal to or lower than the power purchasing price and the power generated by the power generation device is not supplied to the load or the storage battery in a time period having a selling price of power higher than the power purchasing price.

21-15. The method according to any one of 21 to 21-13,
wherein the computer acquires updated remaining discharge capacity information, indicating an amount of power that can be supplied to the load from the storage battery at a predetermined timing, at the timing and updates the upper limit for the discharging time period after the predetermined timing by further using the updated remaining discharge capacity information.

21-16. The method according to any one of 21 to 21-15,
wherein the computer determines the upper limit by further using privilege information indicating a privilege for each time period according to an amount of power supplied from an electric power system.

21-17. The method according to 21-16,
wherein the privilege information is information indicating that a predetermined privilege is obtained when the amount of power supplied from the electric power system in a first time period is smaller than a predetermined value, and
wherein the computer determines the upper limit, which is larger than upper limits for the other discharging time periods, for the discharging time period included in the first time period.

21-18. The method according to any one of 21 to 21-17,
wherein a maximum amount of power that can be discharged in each discharging time period which is specified on the basis of the upper limit of the power or the upper limit of the amount of power is an amount of power which is obtained by subtracting a predetermined amount from an amount of power that can be supplied to the load from the storage battery.

21-19. The method according to any one of 21 to 21-18,
wherein the computer determines a chargeable time period in which the storage battery acquires power from the electric power system and charges the power, and determines a time period except for the chargeable time period as the discharging time period.

22. A program causing a computer to execute a process of determining an upper limit of power discharged from a storage battery or an upper limit of an amount of power discharged from the storage battery for each of discharging time periods divided for each unit time, on the basis of remaining discharge capacity information indicating an amount of power that can be supplied to a load from the storage battery.

22-2. The program according to 22, causing the computer to execute a process of determining the upper limit on the basis of information regarding power to be supplied to the storage battery and the remaining discharge capacity information.

22-3. The program according to 22 or 22-2,
wherein the information regarding power is power purchasing price information indicating a power purchasing price for each time period.

22-4. The program according to 22-3, causing the computer to execute a process of determining the upper limit so that an upper limit in the discharging time period having a relatively high power purchasing price is larger than an upper limit in the discharging time period having a relatively low power purchasing price.

22-5. The program according to 22-3 or 22-4, causing the computer to execute a process of giving priority ranks to the discharging time periods so that a priority rank of the discharging time period having a high power purchasing price is high, and determining the upper limit so that an upper limit for a first discharging time period is set to be equal to or larger than an upper limit for a second discharging time period having a priority rank lower than that of the first discharging time period.

22-6. The program according to any one of 22-3 to 22-5, causing the computer to execute a process of
dividing a plurality of the discharging time periods into a first group in which discharging time periods having a relatively high power purchasing price are collected and a second group in which discharging time periods having a relatively low power purchasing price are collected,
specifying a maximum amount of power that can be discharged in each discharging time period on the basis of the upper limit of the power or the upper limit of the amount of power, and
generating a discharging schedule so that a sum of a first total which is a total of maximum amounts of power in the respective discharging time periods included in the first group and a second total which is a total of maximum amounts of power in the respective discharging time periods, included in the second group, which are temporally prior to at least one discharging time period included in the first group does not exceed a predetermined amount of power which is determined on the basis of the remaining discharge capacity information.

22-7. The program according to 22-6, causing the computer to execute a process of generating the discharging schedule so that a sum of a third total which is a total of maximum amounts of power in the respective discharging time periods, included in the second group, which are temporally after all of the discharging time periods included in the first group, the first total, and the second total is set to be equal to or larger than the predetermined amount of power which is determined on the basis of the remaining discharge capacity information.

22-8. The program according to any one of 22-3 to 22-7, causing the computer to execute a process of determining any one of maximum power that can be discharged from the storage battery and a predetermined value smaller than the maximum power, as the upper limit for each of the discharging time periods.

22-9. The program according to any one of 22-3 to 22-7, causing the computer to execute a process of determining any one of a maximum amount of power that can be discharged from the storage battery per unit time and a predetermined value smaller than the maximum amount of power, as the upper limit for each of the discharging time periods.

22-10. The program according to any one of 22-3 to 22-9, causing the computer to execute a process of determining the upper limit by further using predicted demand information indicating predicted power demand of the load.

22-11. The program according to 22-10, causing the computer to execute a process of determining a value equal to or larger than a value of the predicted power demand in the discharging time period, as the upper limit.

22-12. The program according to any one of 22-3 to 22-11, causing the computer to execute a process of determining the upper limit by further using predicted power generation information indicating a predicted power generation amount for each time period of a power generation device that supplies power to the load or the storage battery.

22-13. The program according to 22-12, causing the computer to execute a process of determining the upper limit by further using power selling price information indicating a selling price of power which is generated by the power generation device.

22-14. The program according to 22-13, causing the computer to execute a process of determining the upper limit on a premise that the power generated by the power generation device is supplied to the load or the storage battery in a time period having a selling price of power equal to or lower than the power purchasing price and the power generated by the power generation device is not supplied to the load or the storage battery in a time period having a selling price of power higher than the power purchasing price.

22-15. The program according to any one of 22 to 22-13, causing the computer to execute a process of acquiring updated remaining discharge capacity information, indicating an amount of power that can be supplied to the load from the storage battery at a predetermined timing, at the timing and updating the upper limit for the discharging time period after the predetermined timing by further using the updated remaining discharge capacity information.

22-16. The program according to any one of 22 to 22-15, causing the computer to execute a process of determining the upper limit by further using privilege information indicating a privilege for each time period according to an amount of power supplied from an electric power system.

22-17. The program according to 22-16,
wherein the privilege information is information indicating that a predetermined privilege is obtained when the amount of power supplied from the electric power system in a first time period is smaller than a predetermined value, and
wherein the program causes the computer to execute a process of determining the upper limit, which is larger than upper limits for the other discharging time periods, for the discharging time period included in the first time period.

22-18. The program according to any one of 22 to 22-17, wherein a maximum amount of power that can be discharged in each discharging time period which is specified on the basis of the upper limit of the power or the upper limit of the amount of power is an amount of power which is obtained by subtracting a predetermined amount from an amount of power that can be supplied to the load from the storage battery.

22-19. The program according to any one of 22 to 22-18, causing the computer to execute a process of determining a chargeable time period in which the storage battery acquires power from the electric power system and charges the power and determining a time period except for the chargeable time period as the discharging time period.

The application is based on Japanese Patent Application No. 2013-200774 filed on Sep. 27, 2013, the content of which is incorporated herein by reference.

The invention claimed is:

1. A storage battery management device for managing a storage battery, comprising:
a memory storing a set of instructions; and
a processor configured to execute the set of instructions to:
determine an upper limit of an amount of power discharged from the storage battery for each of discharging time periods divided for each unit time, based on:
remaining discharge capacity information indicating an amount of power that can be supplied to a load from the storage battery, and
power purchasing price information indicating a power purchasing price for each discharging time period,
wherein the upper limit is determined so that an upper limit in a discharging time period having a relatively high power purchasing price is larger than an upper limit in a discharging time period having a relatively low power purchasing price.

2. The storage battery management device according to claim 1,
wherein priority ranks are given to the discharging time periods so that a priority rank of the discharging time period having a high power purchasing price is high, and the upper limit is determined so that an upper limit for a first discharging time period is set to be equal to or larger than an upper limit for a second discharging time period having a priority rank lower than that of the first discharging time period.

3. The storage battery management device according to claim 1,
wherein either of a maximum power that can be discharged from the storage battery and a predetermined value less than the maximum power is determined as the upper limit for each of the discharging time periods.

4. The storage battery management device according to claim 1,
wherein either of a maximum amount of power that can be discharged from the storage battery per unit time and a predetermined value smaller than the maximum amount of power is determined as the upper limit for each of the discharging time periods.

5. The storage battery management device according to claim 1,
wherein the upper limit is determined by further using predicted demand information indicating predicted power demand of the load.

6. The storage battery management device according to claim 5,
wherein a value equal to or larger than a value of the predicted power demand in the discharging time period is determined as the upper limit.

7. The storage battery management device according to claim 1,
wherein updated remaining discharge capacity information indicating an amount of power that can be supplied to the load from the storage battery at a predetermined timing is acquired, and the upper limit for a discharging time period after the predetermined timing is updated by further using the updated remaining discharge capacity information.

8. The storage battery management device according to claim 1,
wherein a chargeable time period in which the storage battery acquires power from an electric power system and charges the power is determined, and a time period except for the chargeable time period is determined as the discharging time period.

9. A storage battery that discharges power in accordance with the upper limit determined by the storage battery management device according to claim 1.

10. A method of managing a storage battery, the method comprising:
determining an upper limit of an amount of power discharged from the storage battery for each of discharging time periods divided for each unit time, on the basis of:
remaining discharge capacity information indicating an amount of power that can be supplied to a load from the storage battery, and
power purchasing price information indicating a power purchasing price for each discharging time period,
wherein the upper limit is determined so that an upper limit in a discharging time period having a relatively high power purchasing price is larger than an upper limit in a discharging time period having a relatively low power purchasing price.

11. A non-transitory storage medium storing a program which when executed, causes a processor of a computer to perform a method for managing a storage battery, the method comprising:
determining an upper limit of an amount of power discharged from the storage battery for each of discharging time periods divided for each unit time, on the basis of:
remaining discharge capacity information indicating an amount of power that can be supplied to a load from the storage battery, and
power purchasing price information indicating a power purchasing price for each discharging time period,
wherein the upper limit is determined so that an upper limit in a discharging time period having a relatively high power purchasing price is larger than an upper limit in a discharging time period having a relatively low power purchasing price.

12. A storage battery management device for managing a storage battery, comprising:
a memory storing a set of instructions; and
a processor configured to execute the set of instructions to:
determine an upper limit of an amount of power discharged from the storage battery for each of discharging time periods divided for each unit time, on the basis of:
remaining discharge capacity information indicating an amount of power that can be supplied to a load from the storage battery, and
power purchasing price information indicating a power purchasing price for each discharging time period,
wherein a plurality of the discharging time periods are divided into a first group in which discharging time periods having a relatively high power purchasing price are collected and a second group in which discharging time periods having a relatively low power purchasing price are collected,
wherein a maximum amount of power that can be discharged in each discharging time period is specified on the basis of the upper limit of the amount of power, and
wherein a discharging schedule is generated so that a sum of a first total which is a total of maximum amounts of power in respective discharging time periods included in the first group and a second total which is a total of maximum amounts of power in respective discharging time periods included in the second group, which are temporally prior to at least one discharging time period included in the first group, does not exceed a predetermined amount of power which is determined on the basis of the remaining discharge capacity information.

13. A storage battery management device for managing a storage battery, comprising:
a memory storing a set of instructions; and
a processor configured to execute the set of instructions to:
determine an upper limit of an amount of power discharged from the storage battery for each of discharging time periods divided for each unit time, on the basis of:
remaining discharge capacity information indicating an amount of power that can be supplied to a load from the storage battery,
power purchasing price information indicating a power purchasing price for each discharging time period,
predicted power generation information indicating a predicted power generation amount for each discharging time period of a power generation device that supplies power to the load or the storage battery, and
power selling price information indicating a selling price of power which is generated by the power generation device,
wherein the upper limit is determined on a premise that power generated by the power generation device is supplied to the load or the storage battery in a time period having a selling price of power equal to or lower than the power purchasing price and the power generated by the power generation device is not supplied to the load or the storage battery in a time period having a selling price of power higher than the power purchasing price.

14. A storage battery management device for managing a storage battery, comprising:
a memory storing a set of instructions; and
a processor configured to execute the set of instructions to:
determine an upper limit of an amount of power discharged from the storage battery for each of discharging time periods divided for each unit time, on the basis of:
remaining discharge capacity information indicating an amount of power that can be supplied to a load from the storage battery, and
privilege information indicating a privilege for each discharging time period according to an amount of power supplied from an electric power system,
wherein the privilege information is information indicating that a predetermined privilege is obtained when an amount of power supplied from the electric power system in a first time period is smaller than a predetermined value, and wherein an upper limit which is larger than upper limits for the other discharging time periods is determined for a discharging time period included in the first time period.

15. A storage battery management device for managing a storage battery, comprising:

a memory storing a set of instructions; and a processor configured to execute the set of instructions to:

determine an upper limit of an amount of power discharged from the storage battery for each of discharging time periods divided for each unit time, on the basis of remaining discharge capacity information indicating an amount of power that can be supplied to a load from the storage battery, wherein a maximum amount of power that can be discharged in each discharging time period which is determined on the basis of the upper limit, is an amount of power which is obtained by subtracting a predetermined amount from an amount of power that can be supplied to the load from the storage battery.

16. The storage battery management device according to claim 12, wherein the discharging schedule is generated so that a sum of a third total which is a total of maximum amounts of power in respective discharging time periods included in the second group, which are temporally after all discharging time periods included in the first group, the first total, and the second total is set to be equal to or larger than the predetermined amount of power which is determined on the basis of the remaining discharge capacity information.

* * * * *